US012442357B1

(12) United States Patent
Glidden

(10) Patent No.: US 12,442,357 B1
(45) Date of Patent: Oct. 14, 2025

(54) BLADE MOUNTING SYSTEM FOR VERTICAL AXIS WIND TURBINES AND BLADE THEREFORE

(71) Applicant: Mike Glidden, Columbia, MD (US)

(72) Inventor: Mike Glidden, Columbia, MD (US)

( * ) Notice: Subject to any disclaimer, the term of this patent is extended or adjusted under 35 U.S.C. 154(b) by 0 days.

(21) Appl. No.: 18/781,614

(22) Filed: Jul. 23, 2024

Related U.S. Application Data

(60) Provisional application No. 63/515,206, filed on Jul. 24, 2023.

(51) Int. Cl.
*F03D 3/06* (2006.01)
*F03D 3/00* (2006.01)
*F03D 5/04* (2006.01)

(52) U.S. Cl.
CPC .............. *F03D 3/064* (2013.01); *F03D 3/011* (2023.08); *F03D 5/04* (2013.01); *F05B 2240/212* (2013.01); *F05B 2260/502* (2013.01)

(58) Field of Classification Search
CPC . F03D 3/064; F03D 3/011; F03D 5/04; F03D 3/02; F05B 2240/212; F05B 2260/502; Y02E 10/74; Y02E 10/70
USPC .................... 416/132 B; 290/55, 44
See application file for complete search history.

(56) References Cited

U.S. PATENT DOCUMENTS

| | | | |
|---|---|---|---|
| 4,052,134 A * | 10/1977 | Rumsey | F03D 3/067 416/119 |
| 4,274,809 A | 6/1981 | Delgado et al. | |
| 4,366,387 A | 12/1982 | Carter, Jr. et al. | |
| 4,545,729 A | 10/1985 | Storm | |
| 4,606,697 A * | 8/1986 | Appel | F03D 3/02 415/60 |
| 4,756,666 A * | 7/1988 | Labrador | F03D 5/04 416/8 |
| 4,857,753 A | 8/1989 | Mewburn-Crook et al. | |
| 4,859,146 A * | 8/1989 | Labrador | F03D 5/04 416/8 |
| 5,676,524 A | 10/1997 | Lukas | |
| 7,591,635 B2 | 9/2009 | Ryu et al. | |
| 8,648,483 B2 | 2/2014 | Haar | |

(Continued)

FOREIGN PATENT DOCUMENTS

| | | | | |
|---|---|---|---|---|
| CA | 2018199 C | * | 7/1993 | ............... F03D 7/06 |
| DE | 4033078 A1 | * | 4/1992 | ............. F03D 3/007 |

(Continued)

OTHER PUBLICATIONS

Translation DE-4033078-A1 (Year: 2025).*

(Continued)

*Primary Examiner* — J. Todd Newton
(74) *Attorney, Agent, or Firm* — Rosenberg, Klein & Lee

(57) ABSTRACT

A blade mounting system for turbine blades of use in vertical axis wind turbines includes a plurality of pairs of vertically spaced mounting units, each coupled to a framework, and between which a respective one of a plurality of turbine blades is pivotally coupled. Each mounting unit pivotally supports one end of a corresponding turbine blade and is linearly displaceable responsive to load forces on the turbine blade. Each mounting unit includes a restraint system that applies a bias force against the linear displacement of the mounting unit and the blade therewith. Each turbine blade has a cambered airfoil with reversible leading and trailing edges.

13 Claims, 18 Drawing Sheets

(56) References Cited

U.S. PATENT DOCUMENTS

| | | |
|---|---|---|
| 9,133,823 B2 | 9/2015 | Jaw et al. |
| 9,382,897 B2 | 7/2016 | Mertens et al. |
| 9,599,095 B2 | 3/2017 | Armstrong |
| 10,612,515 B2 | 4/2020 | Ryna et al. |
| 11,493,022 B2* | 11/2022 | Liu .................. F03D 5/04 |
| 2010/0202883 A1 | 8/2010 | Daley, III et al. |
| 2010/0295319 A1 | 11/2010 | Britnell |
| 2012/0183400 A1 | 7/2012 | Onodera |
| 2012/0189449 A1 | 7/2012 | Migler |
| 2017/0051720 A1* | 2/2017 | Grigg .................. F03D 3/005 |
| 2019/0003452 A1 | 1/2019 | Barcia, Jr. |
| 2020/0300224 A1 | 9/2020 | Syrovy |

FOREIGN PATENT DOCUMENTS

| | | | |
|---|---|---|---|
| DE | 4038269 A1 | 8/1992 | |
| DE | 4234649 A1 * | 7/1993 | ............ F03D 5/04 |
| GB | 2082262 A * | 3/1982 | ............ F03D 7/06 |
| JP | 6312284 B1 * | 4/1918 | ............ F03D 3/068 |
| TW | M545187 U | 7/2017 | |

OTHER PUBLICATIONS

Translation DE-4234649-A1 (Year: 2025).*
Translation JP-6312284-B1 (Year: 2025).*
Fadil, Jazuli, Soedibyo Soedibyo, and Mochamad Ashari. "Novel of Vertical Axis Wind Turbine with Variable Swept Area Using Fuzzy Logic Controller." International Journal of Intelligent Engineering & Systems 13.3 (2020).

* cited by examiner

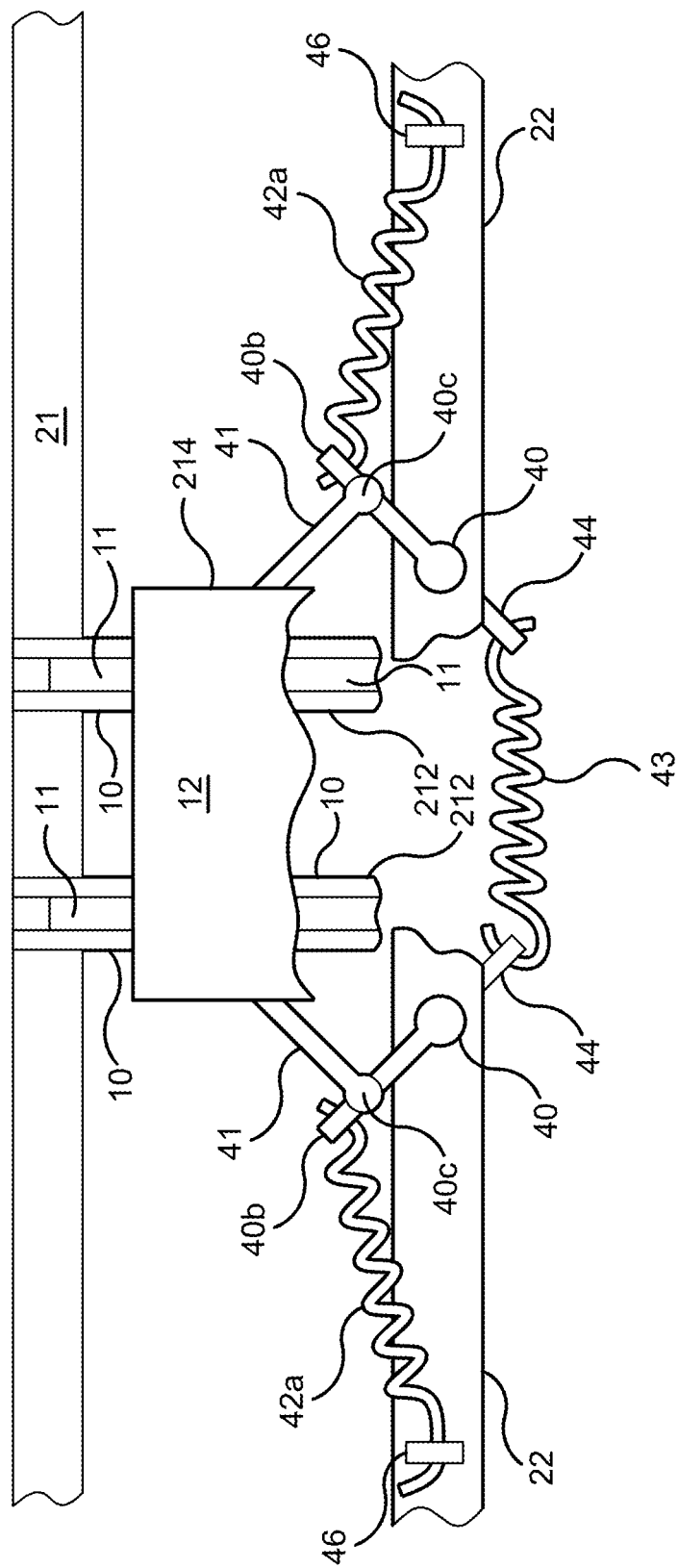

BLADE MOUNTING SYSTEM FOR VERTICAL AXIS WIND TURBINES AND BLADE THEREFORE

BACKGROUND OF THE INVENTION

The commercial generation of power by wind, as on wind farms, is through the utilization of turbines of the horizontal axis category. This category wind turbine is known by the familiar image of a giant propeller atop a tall, slender tower. Being suitably powerful and reliable, these are the wind turbines capable of utility-scale power generation.

There is a second category of wind turbines, known as vertical axis wind turbines, or by the acronym VAWT. Of this category, no turbine suitable for commercial utility has yet been developed. The lack of a VAWT suitable for utility-scale power generation is attributable to the category's problematic aerodynamics which generates a cyclic load against the turbine. Cyclic loading has deleterious effects on a turbine, wearing components and, in some cases, leading to their fatigue and failure. The larger and more powerful the turbine, the more severe the cyclic loading.

Cyclic loading has plagued all the large VAWT prototypes and frustrated attempts to develop a powerful VAWT. It originates in the reversing nature of VAWT aerodynamics, wherein a turbine blade moves with the wind during one leg of its circuit and against the wind in the following leg. This engenders a problematic back-and-forth airflow, encountered by a blade as it moves through its circuit. To address the back-and-forth aerodynamics, a blade having airfoil camber on both sides is deployed and the generation of lift switches from one side to the other as the dual camber blade travels its circuit.

So generated, lift resolves into two orthogonal components: one is motive torque, the other is load. Load is the unwanted component and is directed radially against the turbine as either a push or a pull, that is, either centripetally or centrifugally. As the generation of lift alternates between the inboard side and the outboard side of a blade, load alternates between push and pull. The value of lift varies from point to point on a blade's circuit, and, likewise, the value of load, which varies over a wide range. At one point in a blade's circuit, load reaches its maximum value, exceeding that of motive torque. This is the problematic cyclic loading. Added to the load generated at the blade is the centrifugal force of rotation, which combines with lift vectorially and aggravates cyclic loading.

Wind turbines of the vertical axis category are also known as Darrieus turbines, after the inventor Georges Darrieus. The main aspect of Darrieus design is a turbine supported centrally, at a shaft or a derrick positioned at the axis of rotation. The Darrieus turbine has been the focus of VAWT design and experimentation for the past four decades, during which period about thirty large Darrieus prototypes have been tested. Of these thirty prototypes, none proved suitable for utilization in the commercial generation of power.

Despite such unfavorable results, some students of wind power, including the applicant, consider the vertical axis category to hold potential for an efficient means of generating wind power. Hence, a VAWT that achieves commercial requirements of power and reliability continues as an object of various efforts. The VAWT prototypes have demonstrated, however, that any such effort is doubtful of success if undertaken without an effective remedy against cyclic loading. The disclosed blade mounting system offers such a remedy.

The Darrieus method of supporting the turbine at a central derrick or shaft, presents another obstacle against achieving a powerful turbine. This method of support has shortcomings, in that it imposes practical limits on turbine size and hence, on power, as power is primarily a function of turbine size; indeed, the larger the turbine, the greater its power. Therefore, the present invention utilizes a turbine designed as an annular or polygonal framework, as will be discussed in following paragraphs, rather than the conventional Darrieus turbine structure.

In contrast to the Darrieus turbine, the wind turbine disclosed herein overcomes the problem of cyclic loading by a mounting system that dissipates blade load and may include elements to dampen the blade load as well. The disclosed systems allow a turbine blade to displace against a system of restraint and so, under the push/pull of the reversing load generated at a blade, the blade displaces to-and-fro. Additionally, work producing elements can be added to be driven by the to-and-fro blade displacement to dampen the movement in each direction of displacement.

Each pivotal turbine blade is mounted between an opposing pair of the radially displaceable blade mounting units. Each of the two mounting units is incorporated within a corresponding framework of the wind turbine, supported from beneath that framework, one corresponding to the upper end of the blade and the other to the lower end of the blade. The system of restraint incorporates resilient elements. The resilient elements are formed by various spring arrangements that deflect against displacement of the carriage and may be augmented through non-resilient dampening elements that harness a reciprocating carriage of the blade mounting unit to convert load to power, with a dampening effect.

SUMMARY OF THE INVENTION

A turbine blade mounting system for supporting each of a plurality of turbine blades between a pair of vertically spaced and rotatably supported frameworks of a vertical axis wind turbine, is provided. The turbine blade mounting system includes a pair of mounting units respectively pivotally coupled to opposing ends of a corresponding turbine blade. Each of the pair of mounting units includes a carriage displaceably mounted to a corresponding one of the pair of frameworks. The carriage is displaceable along a radially directed path with respect to a rotational axis of the pair of frameworks. Further, each of the pair of mounting units includes a pivot receptacle mounted to the carriage and into which an end portion of an axial shaft of the corresponding turbine blade is received. Still further, each of the pair of mounting units includes a restraint system coupled to the carriage. The restraint system includes at least a pair of mechanical energy storage elements coupled between the carriage and the corresponding framework for applying a force to the carriage in opposition to displacement of the carriage being displaced in either of opposing radial directions from an initial position.

From another aspect, a turbine blade for a vertical axis wind turbine having a cambered airfoil with reversible leading and trailing edges is provided. The turbine blade includes a longitudinally extended framework formed by a plurality of laterally spaced and longitudinally extended spars and a plurality of laterally extended and longitudinally spaced ribs. The framework includes an end member disposed on each of opposing ends thereof, and an axial shaft extending from each end member. The turbine blade further includes a pliable material covering a first side of the longitudinally extended framework. The pliable material has an interior side affixed to each of a pair of endmost spars of the plurality of laterally spaced spars defining opposing lateral sides of the longitudinally extended framework. Further, the turbine blade includes a rigid material covering an opposing second side of the longitudinally extended framework and affixed to each of the plurality of laterally spaced spars. Still further, the turbine blade includes a pair of longitudinally extended camber forming members that are disposed in laterally spaced relationship and extend between longitudinal ends of the longitudinally extended framework, and each of the pair of camber forming members are coupled to the interior side of the pliable material. The turbine blade still further includes at least a pair of rotatably driven cams disposed within an interior space defined between the pliable material covering and the rigid material covering. The pair of cams being driven to alternatingly change a location of a peak of a camber contour of the turbine blade from a location adjacent one lateral side thereof to a location adjacent an opposing lateral side of the turbine blade, the side of the turbine blade having the pliable material thereon defining the cambered side of the turbine blade.

From yet another aspect, a vertical axis wind turbine is provided. The vertical axis wind turbine includes a pair of vertically spaced and rotatably supported frameworks. The pair of frameworks include a lower framework rotatably supported from beneath that framework and an upper framework supported by the lower framework to rotate therewith. The vertical axis wind turbine includes a multiplicity of pairs of mounting units respectively coupled to the upper and lower frameworks. Each mounting unit of a respective pair of the mounting units is disposed in vertically spaced alignment and each pair of mounting units is disposed in angularly spaced relationship one pair with respect to other pairs of the multiplicity of the pairs of mounting units. Further, the vertical axis wind turbine includes a plurality of turbine blades respectively supported between a respective pair of the multiplicity of pairs of mounting units. Each of the plurality of turbine blades is pivotally coupled on opposing ends thereof to a corresponding one of the pair of mounting units. Each of the plurality of turbine blades has a cambered airfoil with reversible leading and trailing edges. Each of the plurality of turbine blades includes a longitudinally extended framework formed by a plurality of laterally spaced and longitudinally extended spars and a plurality of laterally extended and longitudinally spaced ribs. The framework also includes an end member disposed on each of opposing ends thereof, and an axial shaft extending from each end member. Each of the plurality of turbine blades further includes a pliable material covering a first side of the longitudinally extended framework. The pliable material has an interior side affixed to each of a pair of endmost spars of the plurality of laterally spaced spars defining opposing lateral sides of the longitudinally extended framework. Further, each of the plurality of turbine blades includes a rigid material covering an opposing second side of the longitudinally extended framework and affixed to each of the plurality of laterally spaced spar. Still further, each of the plurality of turbine blades includes a pair of longitudinally extended camber forming members disposed in laterally spaced relationship and extending between longitudinal ends of the longitudinally extended framework. Each pair of camber forming members is coupled to the interior side of the pliable material. Each of the plurality of turbine blades still further includes at least a pair of rotatably driven cams disposed within an interior space defined between the pliable material covering and the rigid material covering. The pair of cams is driven to alternatingly change a location of a peak of a camber contour of the turbine blade from a location adjacent one lateral side thereof to a location adjacent an opposing lateral side of the turbine blade. The side of the turbine blade having the pliable material thereon defines the cambered side of the turbine blade. Each mounting unit of the respective pair of mounting units includes a carriage displaceably mounted to a corresponding one of the pair of frameworks. The carriage is displaceable along a radially directed path with respect to a rotational axis of the pair of frameworks. Further, each mounting unit includes a pivot receptacle mounted to the carriage and into which an end portion of the axial shaft of the corresponding turbine blade is received. Still further, each mounting unit includes a restraint system coupled to the carriage. The restraint system includes at least a pair of mechanical energy storage elements coupled between the carriage and the corresponding framework for applying a force to the carriage in opposition to displacement of the carriage being displaced in either of opposing radial directions from an initial position.

BRIEF DESCRIPTION OF THE DRAWINGS

FIG. 11 is a plan view of a pivotal lever set shown in a deflected state;

DETAILED DESCRIPTION OF THE PREFERRED EMBODIMENTS

Figure 5:
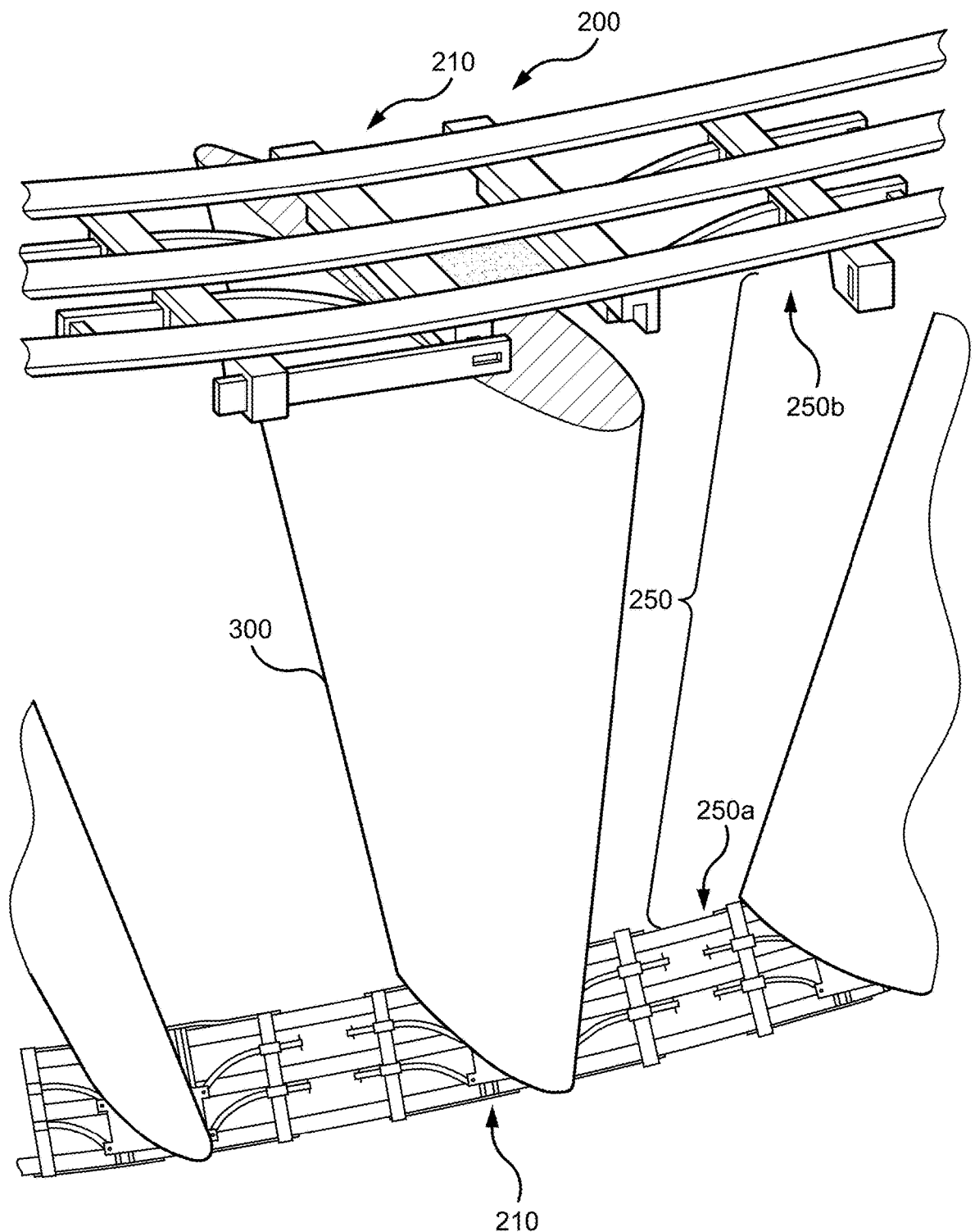
FIG. 5 is a perspective view of a turbine blade vertically mounted between two of the disclosed blade mounts of the blade mounting system of the present invention.

Referring to FIG. 5, the blade mounting system 200 for a vertical axis wind turbine provides for mounting of a turbine blade 300 to the vertical axis wind turbine framework 250. Each of a plurality of turbine blades 300 are mounted between a pair of vertically spaced and rotatably supported frameworks 250a, 250b by a pair of blade mounting units 210, 210, one at each end of the blade 300. Each of the blade mounting units 210 are radially displaceably secured to a corresponding framework 250a, 250b. The frameworks 250a, 250b may have an annular or polygonal contour, with each blade 300 of the vertical axis wind turbine suspended substantially vertically between the two blade mounting units 210. The lower framework 250a is rotatably supported from beneath that lower framework 250a and the upper framework 250b is supported by the lower framework 250a by an interframework arrangement of structural members extending therebetween. The placement locations, size, shape and arrangement of such structural members are conventional, the specifications for which are determined by methods well known in the art, and therefore not shown in the drawings in order to more clearly show the inventive structures. FIG. 5 depicts a blade 300 mounted within an annular framework 250a, 250b, between two of the disclosed blade mounting units 210. It should be understood that that the annular contour shown is exemplary, and that other contours of the frameworks, such as polygonal, may be utilized, as well.

Figure 1:
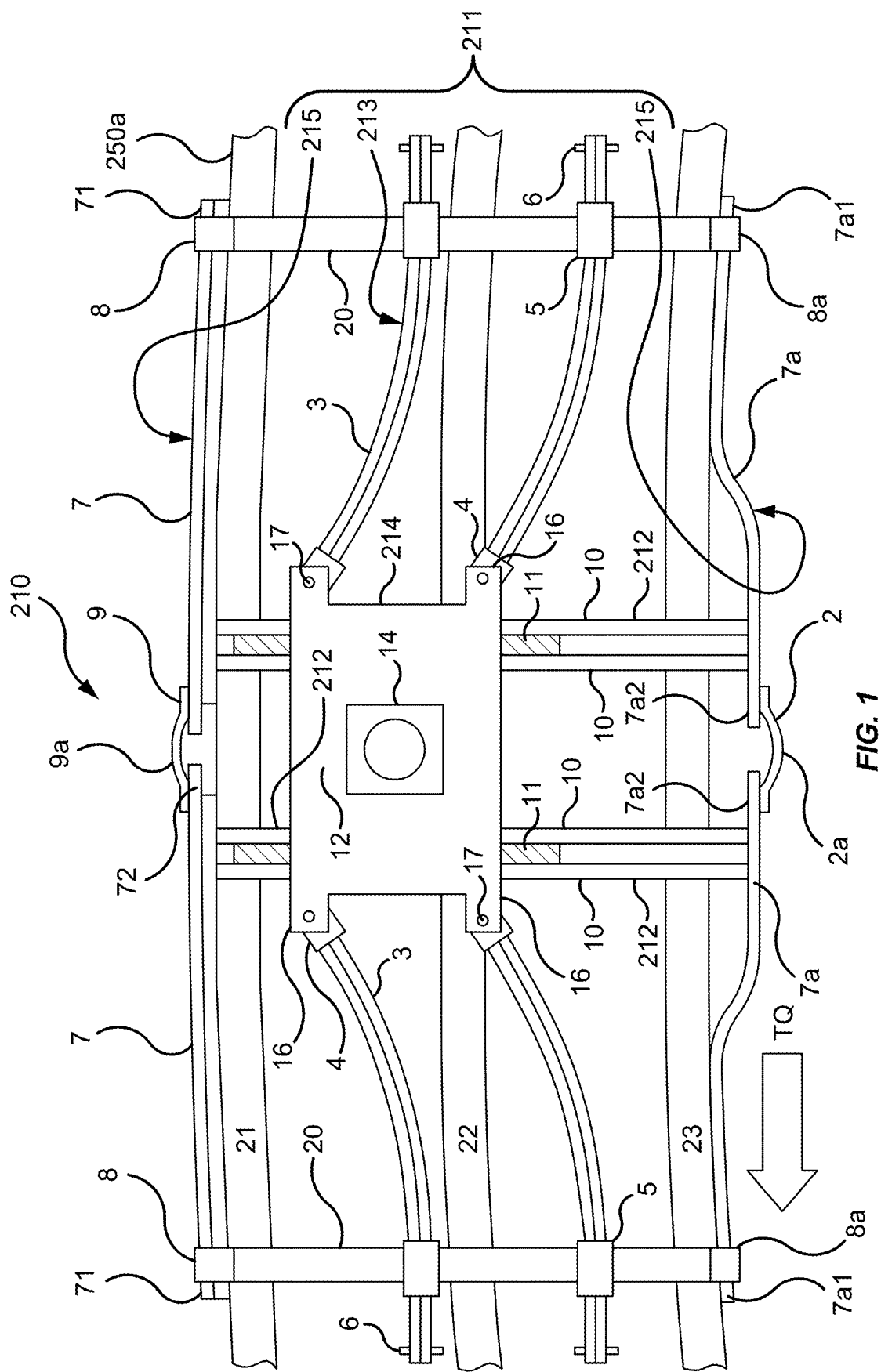
FIG. 1 presents a plan view of an embodiment of a blade mount of the disclosed blade mounting system.
Figure 6:
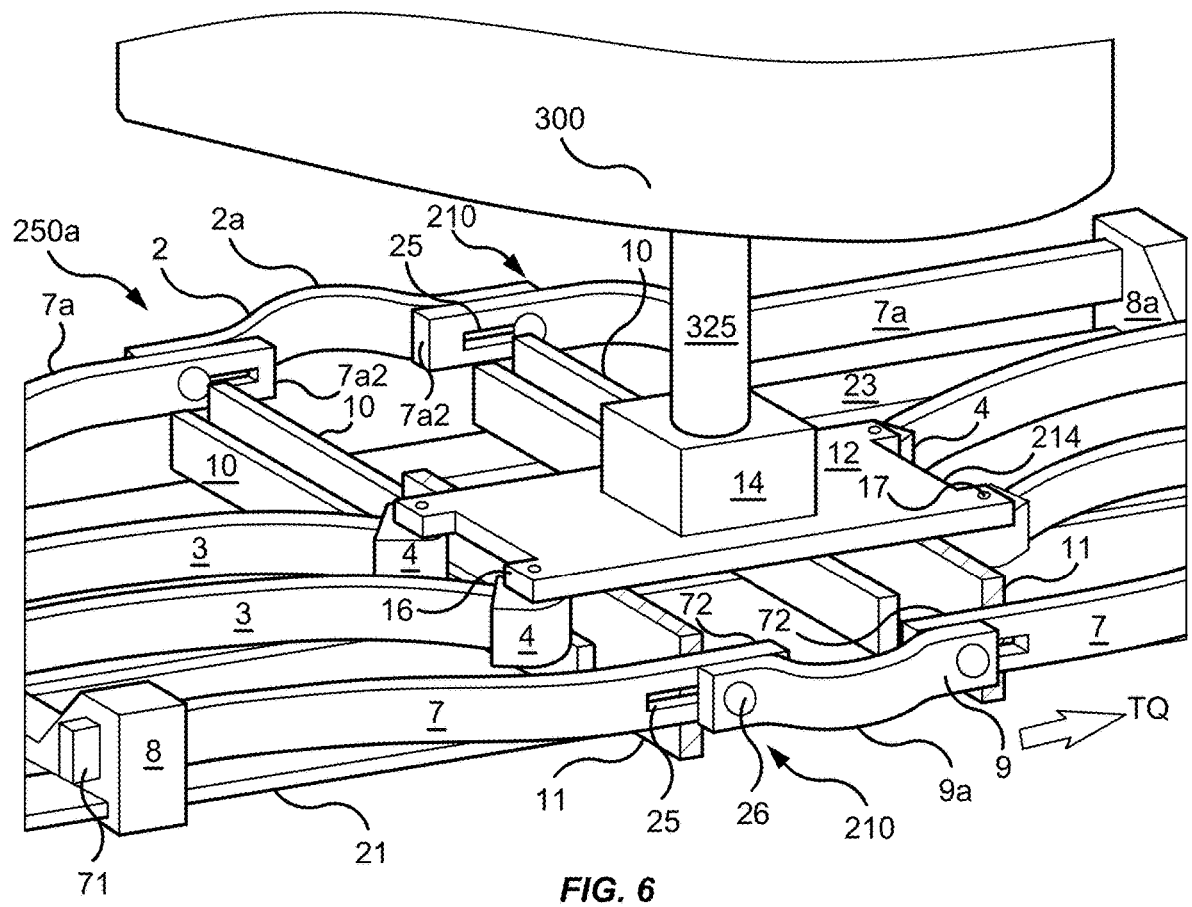
FIG. 6 is a perspective view of the disclosed mounting system embodiment shown in FIG. 1.

FIG. 6 shows one blade mounting unit 210 of the disclosed blade mounting system 200 coupled to a corresponding blade 300 and operating under a load. The plan view of FIG. 1 depicts a segment of the lower framework 250a, with elements 21, 22, 23, each representing segments of concentric framework elements of the lower annular framework 250a, supporting the lower portion of blade mounting system 200. FIG. 1 has an orientation: the top, corresponding to framework element 21, depicts the outboard side of the turbine framework and the bottom, corresponding to framework element 23, depicts the inboard side. Additionally, FIG. 1 has an orientation with respect to the impetus of motive torque, the direction of the impetus being indicated by the leftward pointing arrow TQ at the bottom of the figure. The blade mounting unit 210 for the opposing end of the turbine blade 300 is arranged to mirror that of the mounting unit 210 being described with respect to FIGS. 1-4, 6-15, 21, 22, 24a and 24b.

The blade mounting unit 210 includes a restraint system 211 that at least includes a primary mechanical energy storage assembly 213. The carriage 214 is shown as displaced in the outboard direction as by a centrifugal load, against a counterforce provided by the primary mechanical energy storage assembly 213 of restraint system 211. The primary mechanical energy storage assembly 213 includes mechanical energy storage units, which may take the form of multiple leaf springs 3 arranged against displacement of the carriage 214. Each leaf spring 3 may be formed by multiple leaf springs arranged in parallel to provide a greater counter force to the displacement of the carriage 214. While four leaf springs are shown in the embodiment, the primary mechanical energy storage assembly 213 may comprise a single pair of leaf springs 3. In such an arrangement, each of the pair of leaf springs 3 is pivotally coupled to opposing sides of the carriage 214 and is useful for use with vertical axis wind turbines of lower capacity than that which is supported by the embodiment shown in FIGS. 1-22. As will be described in following paragraphs, the mechanical energy storage units of the primary mechanical energy storage assembly 213 may be formed by other types of springs, including torsion springs, coil extension springs, gas springs, and combinations thereof. These other types of mechanical energy storage units may be used in combination with the leaf type springs 3 to define the primary mechanical energy storage assembly 213 of the restraint system 211.

In FIG. 1, a radially aligned component of the blade mounting unit 210 includes a pair of identical tracks 212, each formed by a pair of parallel spaced and radially extending sides 10. Each track 212 is fixed to and extends across the framework elements 21, 22, and 23. The carriage 214 includes a bench 12 to which two slides 11 are attached to a side of the bench opposite to the side to which the blade is pivotally supported. The two slides 11 are respectively slidably displaceable on the pair of tracks 212 (slides are shaded for ready identification), each slide 11 being disposed between parallel sides 10 of a respective one of the tracks 212. Alternately, the pairs of slides 11 and tracks 212 may be transposed, with the slides 11 being affixed to and extending radially across the framework elements 21, 22, and 23 in respective correspondence with the pair of tracks 212 being mounted to the side of the bench opposite to the side to which the blade is pivotally supported, without departing from the inventive concepts disclosed herein. Obviously the respective longitudinal extent of each of the slides 11 and tracks 212 would be interchanged accordingly, with the length of the track being appropriate for the size of the bench 12 and the length of the slide 11 being sufficient to span the framework elements 21, 22, and 23.

In the embodiment shown, the bench 12 has four projections 16, one at each corner of the bench, each being coupled to a corresponding leaf spring 3 by a corresponding pivotal coupling 17. The bench 12 further supports a receptacle 14 into which is received an axial shaft (blade pivot) 325 that extends from each end of the turbine blade 300. The receptacle 14 provides a pivotal coupling for the shaft 325, supporting the pivotal axis of a turbine blade 300.

Figure 2:
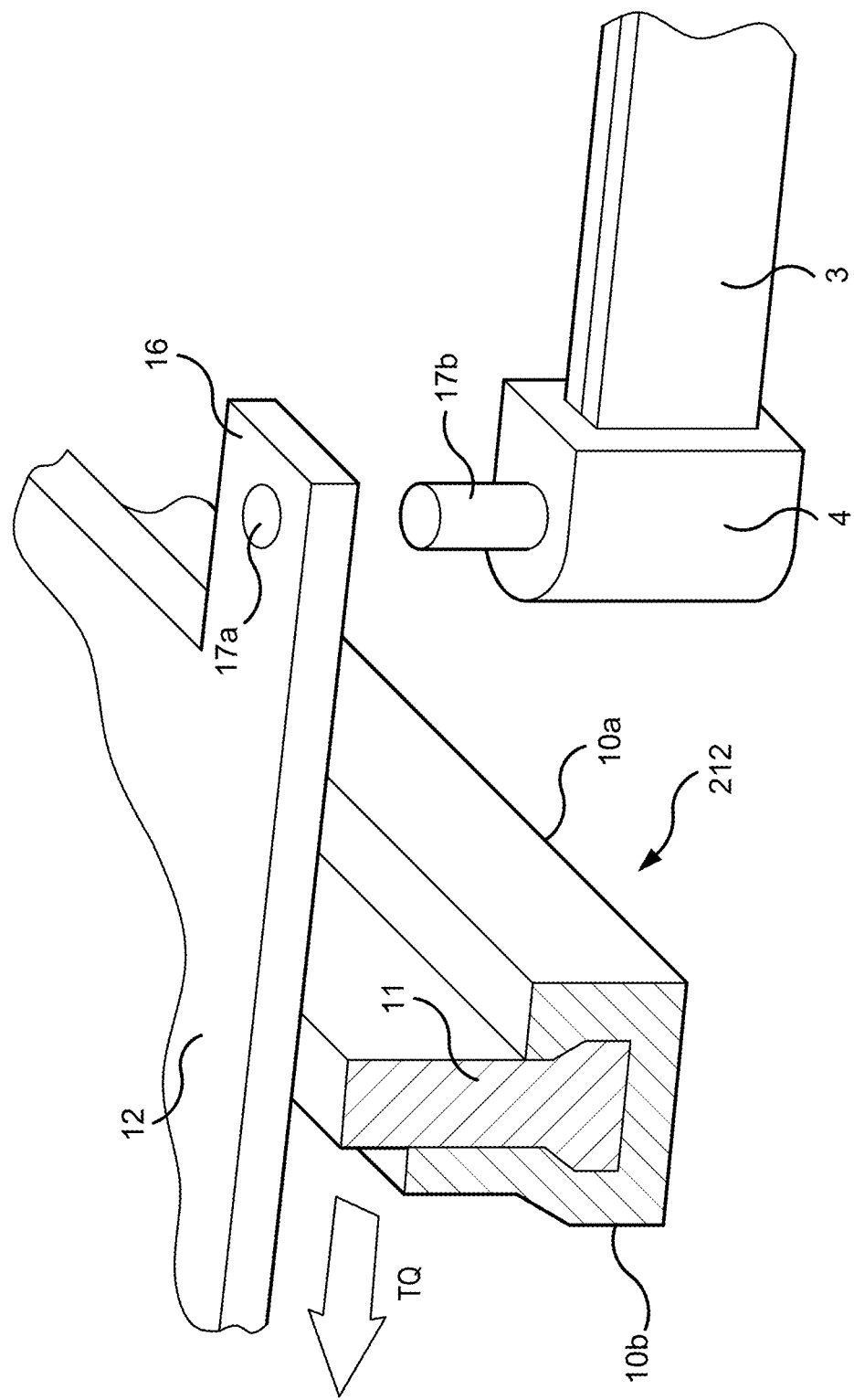
FIG. 2 is a partial sectional exploded view of a portion of FIG. 1.

FIG. 2 presents a cross-sectional view of a flanged slide 11 fitted within a complementary track 212. The track 212 has a non-symmetrical configuration, with a side 10a and a more substantial side 10b that bears the load of motive torque, whose impetus is indicated by the directional arrow TQ. The bench 12 is also shown with a representative one of the four projection 16 and a pivot coupling 17 being formed by the pivot coupling hole 17a into which is received a pivotal coupling pin 17b extending from the pivotal clamp 4 of a leaf spring 3 (shown as an exploded view) for coupling of the leaf spring 3 to the bench 12. Pivot coupling hole 17a may include a sleeve or roller bearing (not shown for drawing clarity) into which the pivotal coupling pin 17b is received FIG. 1 shows four leaf springs 3, denoted herein as primary springs, deflecting against displacement of the carriage 214. Each primary spring 3 is coupled to a projection 16 at a corner of the bench 12. A primary spring 3 is shown as a composite of straight leaf springs joined together at one end by a pivotal clamp 4 and at the opposite end by a pin 6. Restraint system 211 further includes a secondary mechanical energy storage assembly 215 that includes auxiliary leaf springs 7 and 7a placed along the outermost framework members 21 and 23, respectively.

Each primary spring 3 is arranged to extend, extension being necessary to its deflection, and explained as follows. With reference to FIG. 1, a pivotal clamp 4 is coupled to a corresponding bench projection 16 which coupling forces the corresponding primary spring 3 to deflect responsive to linear motion of the carriage 214. Hence, the clamped end of each primary spring 3 describes a linear path as it deflects. This linear motion entails an increasing arc of deflection, and therefore, must be accompanied by extension of the primary spring 3 to accommodate the increase in the arc. Otherwise, a primary spring 3 cannot deflect and, instead, would limit displacement of the carriage 214. Extension of a primary spring 3 is provided by a reserve length of the primary spring 3 established between a corresponding seat 5 and the pin 6 joining the leaf springs that together form the primary spring 3.

Figure 3:
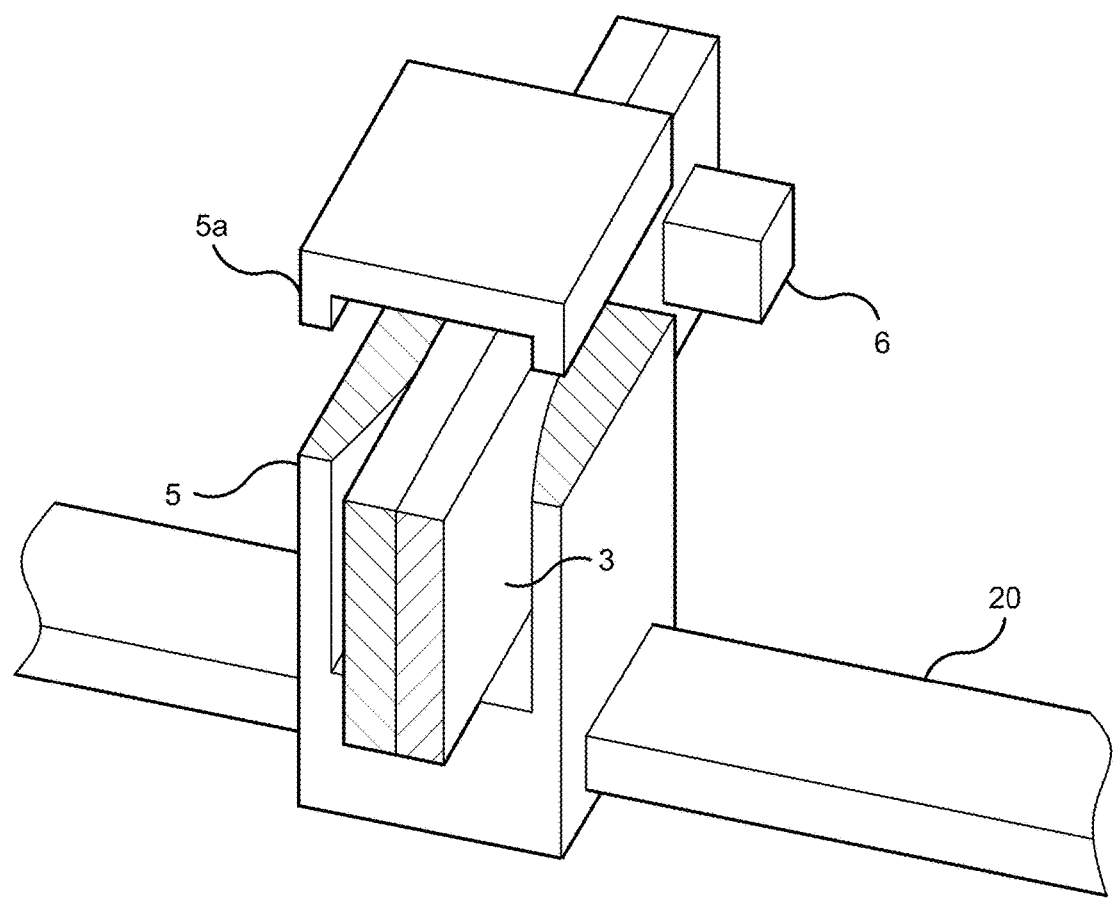
FIG. 3 shows a partially sectioned perspective view of the seat of a primary spring.

Each primary spring 3 extends as its reserve length passes through a corresponding seat 5 fixed to a framework cross element 20. Each framework cross element 20 is fixed to and extends across the framework elements 21, 22, and 23. The seat 5 provides a bearing surface for the reserve length of primary spring 3 as it is drawn therethrough by the displacement of the carriage 214 and functions as a stop in conjunction with the pin 6. As the carriage reverses displacement and deflection of a primary leaf spring 3 relaxes, the reserve length reverses its movement. In effect, a reserve length reciprocates through its seat 5, its movement matching the reciprocation of the carriage as it deflects and relaxes the corresponding primary spring 3. FIG. 3 depicts a seat 5 fixed to corresponding framework cross element 20. The seat 5 is shown in an exploded sectional view with the top portion 5a separated and elevated above the remaining portion to show the passage of the primary spring 3 therethrough. The primary spring 3, shown in this exemplary embodiment as being composed of two individual leaf springs, and the reserve length thereof, shown truncated in the sectional view, passes between the bearing surfaces of the seat 5 while being supported thereupon. The displacement of the reserve length of the primary spring 3 through the seat 5 is limited in its travel, as the pin 6 will be stopped against the seat 5 and thereby blocks further deflection of the corresponding primary spring 3.

As the deflections of the primary springs 3 each relax, the pinned ends 6 reverse their travel, moving away from their respective seats 5 as the springs straighten. The straight, undeflected primary springs 3 indicate that the load on the carriage 214 is insignificant, or null. If the turbine is in service and rotating, a condition of null load indicates a balance of opposite and equivalent loads, as when the centrifugal force of rotation balances against an equivalent load directed centripetally as a component of lift. In the obverse condition, wherein a centrifugal component of lift adds to the centrifugal force of rotation, the result is a double load on the carriage 214. These two opposed conditions are instances of the vector dynamics ever-present in a VAWT system, whereby the varying load generated at a blade combines vectorially with the centrifugal force of rotation. Vector dynamics results in a centrifugal load that is much greater than the centripetal load, as compared maximally. Therefore, the blade mounting system 200 must provide a much greater capacity of restraint against centrifugal displacement of the carriage than against centripetal displacement.

The required greater capacity of restraint is provided through the offset of the carriage 214 toward the inboard side of the annular framework 250a, 250b, the offset being the initial (resting) position of the carriage 214. This offset can be visualized as the carriage 214 being positioned with the primary springs 3 in a straight configuration applying zero force to the carriage 214. Offset of a carriage toward the inboard side allows for a further displacement of the carriage centrifugally, which greater length of displacement results in a greater deflection of the primary springs (in whatever form they are implemented), with each additional degree of deflection providing increased restraint against the centrifugally directed load.

The capacity of restraint against centrifugal displacement is augmented by a secondary mechanical energy storage assembly 215 positioned along the outermost framework elements 21 and 23. In the embodiment of FIG. 1, the secondary mechanical energy storage assembly 215 includes leaf springs 7 and 7a intersecting the radial travel path of the carriage 214. As shown, a pair of outboard auxiliary leaf springs 7 are positioned along the outboard framework element 21. Each outboard auxiliary spring 7 is shown as a composite of multiple parallel straight leaf spring members, but may be formed by a single leaf spring member or any number of paralleled leaf spring members, as a function of the amount of restraint force required. One end 71 of each outboard auxiliary spring 7 is fixed in a seat 8 at the end of a framework cross element 20, configured for that purpose, with the auxiliary spring 7 extending along framework element 21 across the outboard terminus of a corresponding track 212. The opposing free end 72 of each auxiliary spring 7 deflects against the corresponding end of a respective displacing slide 11. FIG. 6 gives a perspective view of an auxiliary leaf spring secured at 8 and described in following paragraphs.

The secondary mechanical energy storage assembly 215 further includes a pair of inboard auxiliary springs 7a situated at the inboard side of the framework 250a, 250b to deflect against weaker centripetal loads. Inboard auxiliary springs 7a are pre-shaped to have an arcuate end contour with one end 7al secured to the end 8a of framework element 23, at the inboard framework element 23. extending along that element and across the projecting terminus of a track 212. It may be noted that a track 212 projects beyond the inboard element 23. This projection augments the restraint against centripetal loads, as the carriage 214 is provided with a greater length of displacement, with a greater deflection of the primary springs as a consequence.

Inboard and outboard auxiliary springs 7, 7a are arranged to deflect one way, in contrast to the primary springs 3 which deflect bidirectionally. Auxiliary springs 7, 7a do not deflect until the primary springs 3 have deflected to a certain degree, at which point the slides 11 engage the auxiliary springs 7, 7a. Beyond this point, both the primary springs 3 and auxiliary springs 7, 7a deflect against the load, the greater the load, the greater the deflection. Outboard auxiliary springs 7 are designed to have greater resilience than inboard auxiliary springs 7a, as such is needed against the greater loads that are directed against them.

Figure 4:
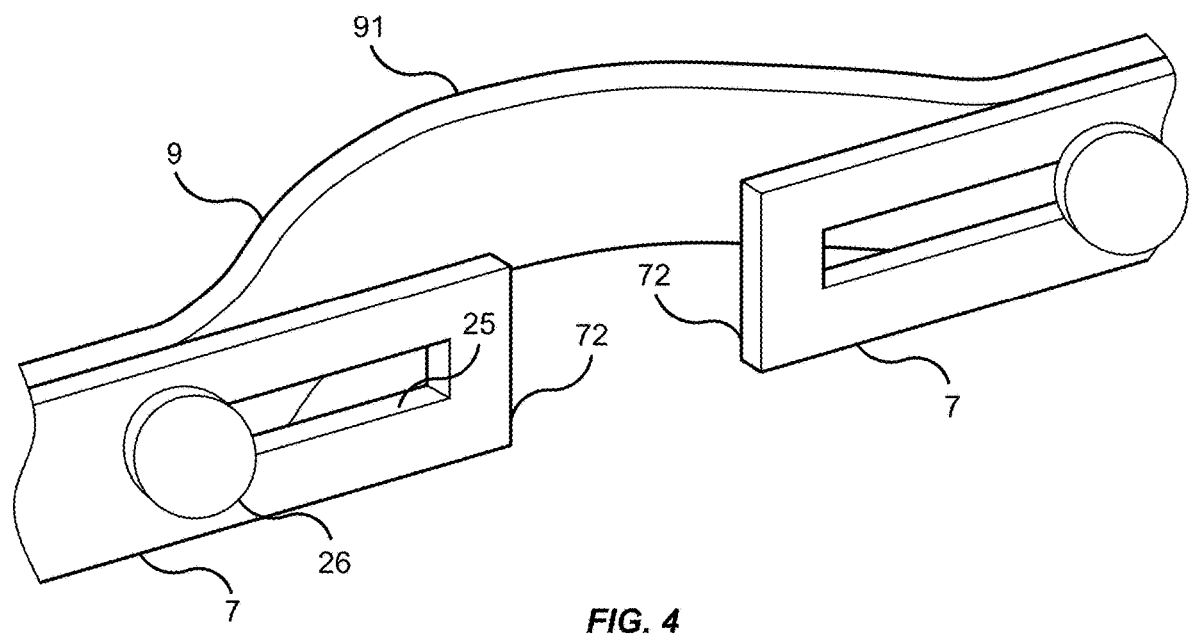
FIG. 4 is a perspective view of an arcuate leaf spring linking an auxiliary spring.

Auxiliary springs 7 and 7a are designed with a structure to limit deflection. FIG. 4 shows the ends 72 of a pair of outboard auxiliary springs 7 arranged in close proximity one to the other. The ends 72 are linked together by an arcuate leaf spring 9 which deflects with a flattening of its curved portion 91 thereof, as the auxiliary springs 7 deflect outwardly. As the arcuate spring 9 flattens, deflection of the auxiliary springs is stopped, and thereby functions as a stop against the corresponding slides 11 and further displacement of a carriage 214. At the free end 72 of an outboard auxiliary spring 7 there is formed a slot 25 through which the corresponding arcuate spring 9 is joined to the auxiliary spring 7 by a linkage pin 26. This slot 25 provides the linkage pin 26 free travel as the auxiliary spring 7 first deflects, thus retarding the deflection of the arcuate spring 9 until the auxiliary spring has deflected to the point where the linkage pin has traveled the length of the slot. Once the linkage pin 26 reaches the end of the slot 25, the arcuate spring 9 starts to deflect, that is, flatten. Retarding deflection of an arcuate spring 9 allows the pair of auxiliary springs 7, 7 to reach full deflection before being held back by the connecting flattened arcuate spring 9. In a like manner of retarding deflection, a slot may be provided in the arcuate linkage spring 9 instead of the auxiliary springs 7, 7, or formed in a combination of both the arcuate spring 9 and auxiliary springs 7, 7. The free ends 7a2 of inboard auxiliary springs 7a likewise are linked by an arcuate spring 2, configured similarly to arcuate spring 9, to halt further centripetal deflection and displacement in the same manner as described for the auxiliary springs 7, 7.

As a carriage 214 displaces under a full centrifugal load and each primary spring 3 deflects, and their respective pinned ends 6 displace commensurately with deflection until they each meet the seat 5, through which each primary spring correspondingly passes, where their displacement is stopped. At this point, each primary spring 3 is at full deflection, forming an arc from the seat 5 to the pivotal clamp 4. At the same instant, the pair of auxiliary leaf springs 7 are also fully deflected and stopped by the flattened arcuate spring 9 that joins the pair of auxiliary leaf springs 7. In other words, as the system of restraint is designed, all springs reach maximum deflection at substantially the same time, which synchronicity sets the limit of the restraining capacity of the blade mounting unit 210 and stops displacement of a carriage 214; and with the upper and lower blade mounts operating in concert, defines the restraining capacity of the blade mounting system 200.

The full capacity of a system of restraint is expressed as a load, which load may be calculated. The full capacity of restraint delimits practical operation of the turbine. Loads, or anticipated loads, above this practical limit give cause to modify operation of a turbine, or to suspend its operation, temporarily removing it from service. 16) FIG. 6 presents a perspective view of the disclosed blade mounting unit 210, as installed on the lower member of the lower annular framework 250a, with a blade 300 pivotally coupled to the receptacle 14 through the blade shaft 325. Another identical blade mounting unit 210 is disposed in an inverted orientation on the upper annular framework 250b to work in concert with the blade mounting unit 210 disposed on the lower annual framework 250a. In FIG. 6, the primary springs 3 and auxiliary springs 7, 7a are depicted as solitary leaf springs, and as previously discussed, the springs 3, 7, 7a, 9 and 2 may be formed by singular leaf spring members or an assembly of multiple parallel leaf members. Framework elements are obscured by other components, with elements 21 and 23 identified. The impulse of motive torque is indicated by the directional arrow TQ. Referring additionally to FIG. 1 may help one comprehend details of FIG. 6. The carriage is shown as displaced centrifugally with primary springs 3 consequently deflected. The ends of slides 11 have been displaced past the terminus of the tracks 212 to engage and deflect outboard auxiliary springs 7, as signified by the bow of the otherwise straight springs. Slides 11 are partly shaded for ready identification. The pins 26 of arcuate linkage spring 9 have traveled the length of the corresponding slots 25. The blade mounting unit 210, installed on the upper framework 250b is the mirror image of the shown in FIG. 6 and described above.

Figure 7:
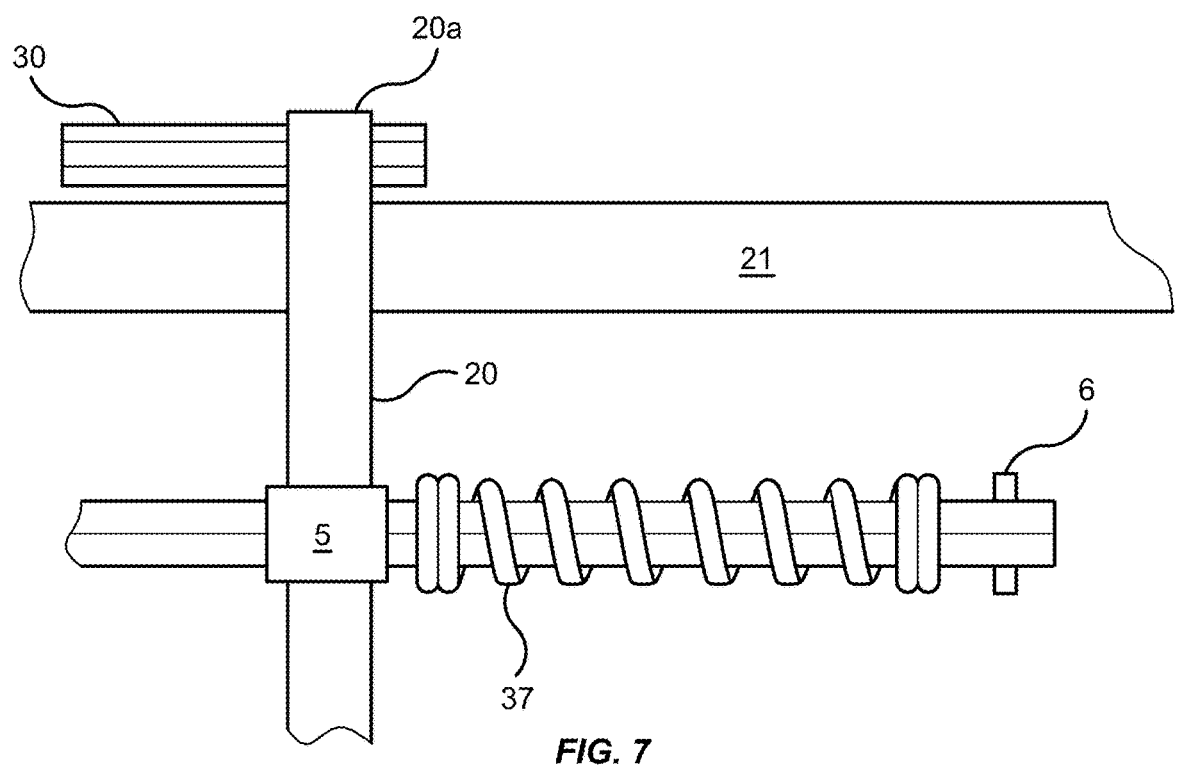
FIG. 7 provides a plan view of a compression spring enclosing the end of a primary spring, plus the secured end of a torsion bar.

The restraint system 211 specified above may be augmented through additional resilient elements arranged to deflect against displacement of the carriage 214. For example, an augmentative compression spring may be fitted around the reserve length of a primary spring, positioned between its pin 6 and seat 5. In this case, a coil spring or a volute spring encloses the reserve length and compresses against the travel of the pin 6 and the seat 5. FIG. 7 depicts an augmentative coil spring 37 surrounding the reserve length of primary spring 3 (shown undeflected). Note that, the reserve length of the primary spring 3 is selected to accommodate the augmentative coil spring 37 at full compression while providing the same maximum displacement limitation of the carriage 214 as for the restraint system 211 where the augmentative coil spring 37 is not utilized. FIG. 7 also depicts a torsion bar 30 which is one of a pair of such spring members, and the pair of torsion bars 30 are arranged to function as the outboard auxiliary spring, as will be discussed below.

Figure 8:
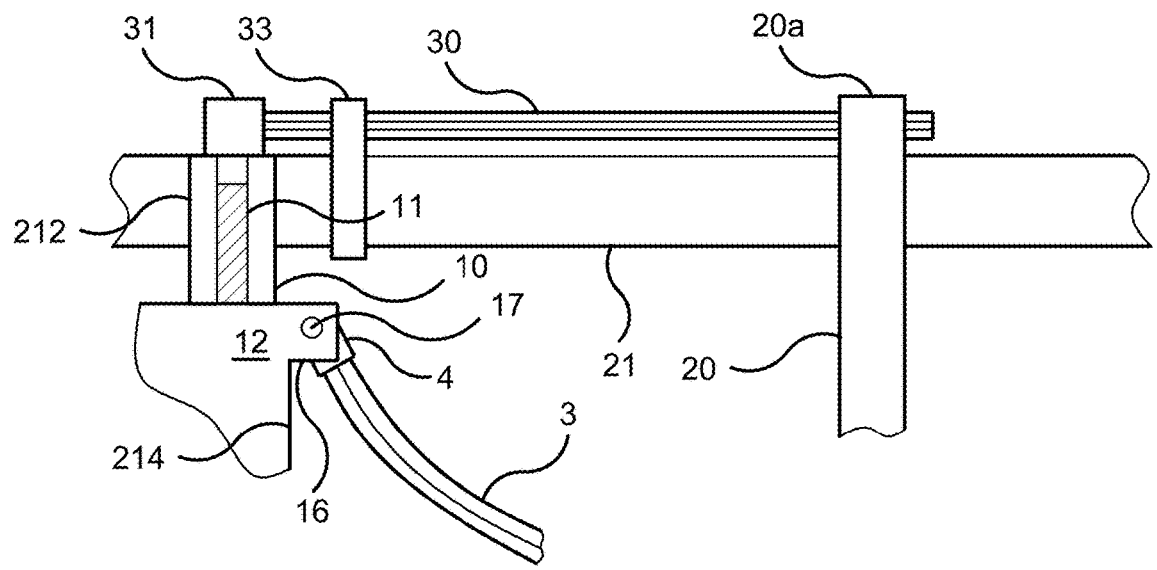
FIG. 8 depicts a torsion bar arrangement.
Figure 9:
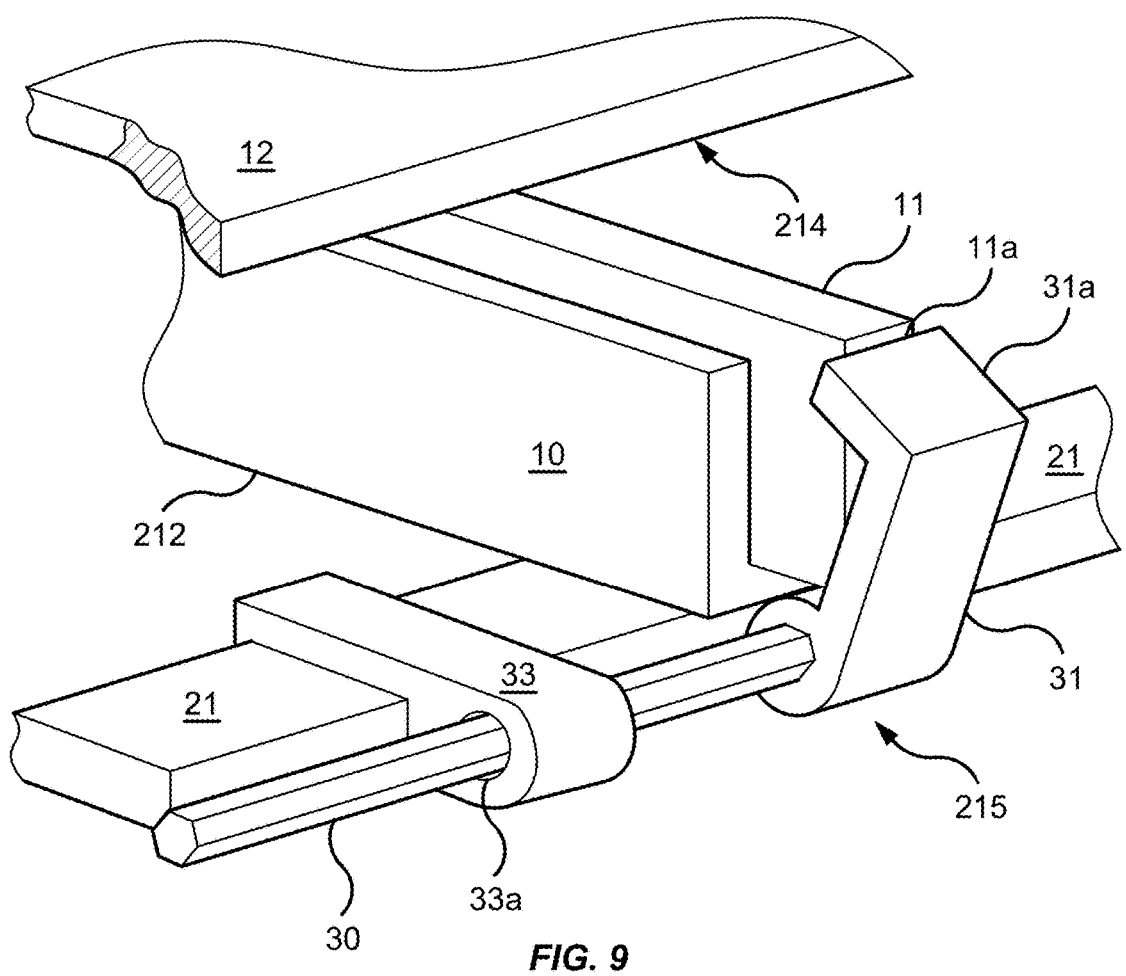
FIG. 9 shows a perspective view of the torsion bar arrangement of FIG. 8.

Referring now to FIGS. 8 and 9, the secondary mechanical energy storage assembly 213 utilizes torsion as the mechanical energy storage mechanism. This torsion bar arrangement provides another implementation of the secondary mechanical energy storage assembly 215. A torsion bar 30 is arranged along the outside framework element 21 adjacent to the track 212. One end of the torsion bar 30 is affixed at the end of cross element 20 within seat 20a, and an intermediate support member 33 supports the torsion bar 30, adjacent an opposing end of the torsion bar 30, while allowing for rotation therein. Also shown in FIG. 8 is the track 212, the slide 11 within the track 212, and the corner portion of the bench 12. FIGS. 7 and 8 show an extended portion of cross element 20 with the end of a torsion bar 30 secured at seat 20a disposed thereat. FIG. 9 presents a perspective view of the torsion bar arrangement shown in FIG. 8. As shown, the slide 11 has been displaced under load and extending slightly past the terminus of the track 212, through which it slides, and thereby contacts and angularly deflects the torsion bar lever 31. The lever 31 thereby induces torsion in the torsion bar 30. The distal end of the torsion bar lever 31 is formed with a catch 31a. The catch 31a serves as the contact portion of the torsion bar lever 31 that is contacted by the toe 11a of the slide 11. After the torsion bar lever 31 has been deflected through an angle of approximately ninety degrees, which angle is the maximum deflection of the lever 31, the catch 31a then arrests any further displacement of the slide 11, and the restraint system 211 is bearing load at full capacity. Any load exceeding this capacity is transmitted through the torsion bar, as a radially directed force, which force is transferred to the torsion bar support member 33 that is secured to outboard framework element 21. Thus, the torsion bar arrangement, like that of the auxiliary leaf spring arrangement, previously described, provides a stop against further displacement of the carriage 214. The torsion bar 30 passes freely through the eye 33a of the support member 33, and thus the torsion bar 30 is supported without impeding rotative deflection, or torsion, of the bar 30.

Figure 10:
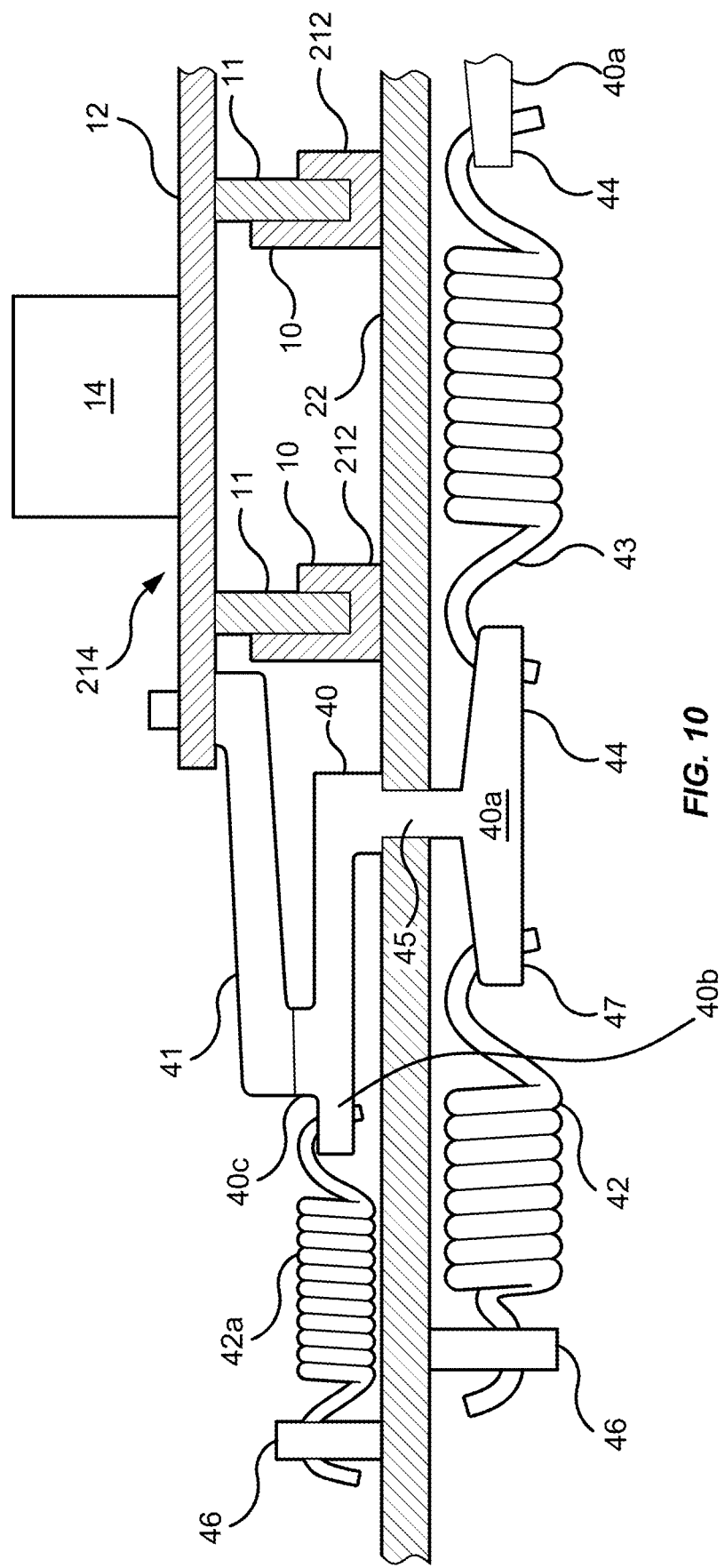
FIG. 10 shows a pivotal lever set undeflected.

Another configuration of the restraint system 211 is depicted in FIGS. 10 and 11, showing a primary mechanical energy storage assembly 213 formed by resilient mechanical energy storage elements 42, 42a, 43 that connect to a pivotal set of levers 40 ("lever set") and apply force against lever set 40 as it pivots responsive to the displacement of carriage 214. In FIGS. 10 and 11, the lever set 40 connects to a plurality of extension coil springs 42, 42a, 43. The lever set 40 provides for the paralleling of the coil springs and thereby increases the counter force provided thereby. Referring to FIG. 10, a carriage 214 is shown with a bench 12 and slides 11, with tracks 212 and a (central) framework element 22, shown in a cross-sectional view, and a turbine blade coupling 14 supported on the bench 12. A lever set 40 pivotally connects to the bench 12 through a coupling arm 41, the arm itself is free to pivot at both ends thereof, one end being pivotally coupled to the bench 12 and the other end coupled to a pivotal connection 40c of the lever set 40. As the carriage 214 displaces, the coupling arm 41 transmits this movement to the lever set 40, and thus displacement of carriage 214 translates into pivoting of the lever set 40 against the bias forces of the extension coil springs 42, 42a, and 43. The extension of the springs 42a and 43 is illustrated in FIG. 11. Referring further to FIG. 10, the lever set 40 is coupled by a pivot shaft 45 to the framework element 22, which element provides a female counterpart to the pivot shaft 45, with the pivot shaft 45, extending through framework member 22, to a dual lever 40a. In addition to the coupling arm 41, the lever set 40 has three additional levers defined by the lever 40b and dual lever 40a, each respectively connected to a corresponding extension coil spring that deflects against the displacement of the carriage 214. A spring 42 extends between end 47 of the dual lever 40a and an anchor 46 fixed to the framework member 22, with a second spring 42a likewise anchored on one end thereof by an anchor 46 on the opposite side of framework member 22 and the opposing end of the spring 42a being coupled to the lever 40b. A third spring 43 is not anchored but connects between two levers 44, 44, each lever 44 belonging to a separate lever set 40, with the two lever sets 40, 40 positioned on opposite sides of the carriage. For simplicity of the drawing, only one lever set 40 is depicted in FIG. 10, the second being cropped from the view, excepting its lever 44 which is shown connected to the spring 43. Hence, as depicted in FIG. 11, two pivotal lever sets 40, one at each side of the carriage 214, are interconnected through the extension coil spring 43 which extends resiliently between the two sets 40 as they pivot. FIG. 10 depicts the coil springs as being in a relaxed state (undeflected), and shows that a pivotal lever set 40, including coupling arm 41, aligns orthogonally to the carriage 214 when it bears no load. Whereas FIG. 11 depicts the carriage as being displaced under load, the lever sets 40, 40 are pivoted by means of the coupling arms 41, 41, with the coil springs 42a and 43 resiliently extended (coil spring 42 not being visible in that view). It may be noted that that a lever set 40 pivots counterclockwise or clockwise, either way, according to the direction a carriage displaces, whether inboard or outboard. Thus, each lever set 40 requires an arc of about one-hundred eighty degrees to freely pivot. Also, it may be noted that as the carriage 214 displaces, the two lever sets pivot oppositely, that is, one lever set 40 pivots clockwise while the other pivots counterclockwise, with the coil spring 43 resiliently extended between them. FIG. 11 shows the carriage 214 in a cutaway view, with slides 11, bench 12, tracks 212 and element 22 depicted in part and other components of the disclosed mounting system omitted for clarity of the drawing. Tracks 212 terminate on framework element 21. A coupling arm 41 is coupled to each side of the carriage at a corresponding edge of a bench 12, between the corners of the bench 12. The other coil springs 42 are obscured by framework element 22 in the view. It should be noted that while the coil springs 42, 42a and 43 are depicted as being formed by a single winding of wire, they can be formed by multiple coaxial windings where higher bias force and minimum spring diameter are required.

Figure 12A:
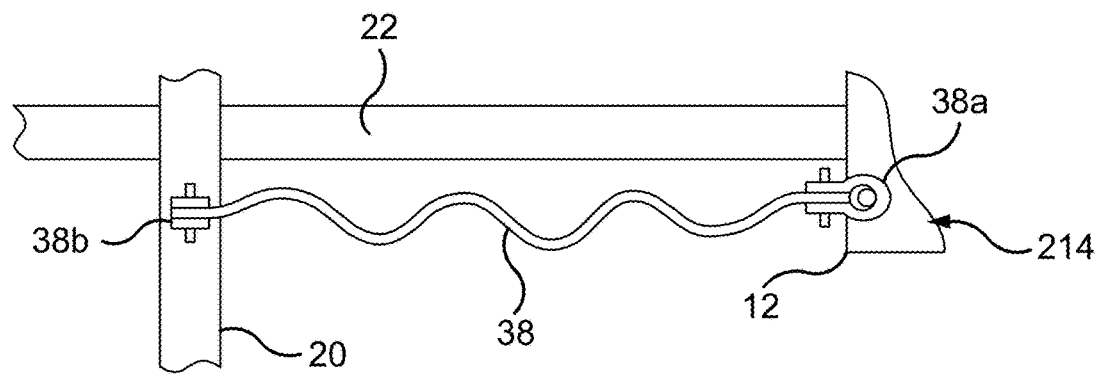
FIG. 12a and FIG. 12b show a serpentine spring arrangement.
Figure 12B:
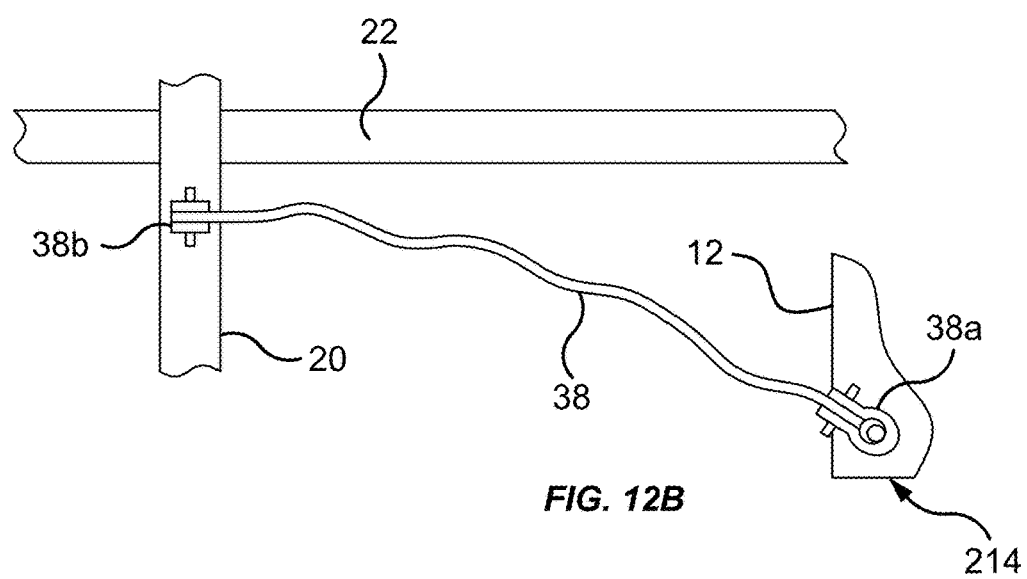

FIGS. 12a and 12b show a plan view of yet another configuration of the restraint system 211, wherein multiple serpentine leaf springs 38, only a representative one of which is depicted, define the primary mechanical energy storage assembly 213. The serpentine leaf springs 38 are arranged to deflect against displacement of the carriage 214 in the same manner as the leaf springs 3 shown in FIG. 1. In FIG. 12a, an undeflected serpentine leaf spring 38 is pivotally coupled to a corner portion of the bench 12, which may be a projection 16 thereof, with its opposing end fixed to the framework cross element 20 which is connected to the central framework element 22, as well as to the other framework members (not shown in the figure). As the carriage 214 displaces, the serpentine leaf spring 38 extends as it deflects, its serpentine form flattening and elongating, as shown in FIG. 12b. The serpentine spring 38 is pivotally coupled to the bench 12 by means of a shackle 38a pinned to the end of the spring end, but any suitable coupling means known in the art may be used. The opposing end of serpentine spring 38 is pinned to a double ear bracket 38b affixed to the cross element 20. Thus, the serpentine leaf spring 38 deflects as an extension spring, elongating in accommodation of the displacement of a carriage 214. In a variation of the configuration of FIGS. 12a and 12a, another type of extension spring may be substituted for the serpentine leaf spring 38, for example, an extension coil spring could replace the serpentine spring, or be combined with a serpentine spring in the above arrangement. A serpentine spring can be formed of one leaf member or multiple leaf members similarly formed and conjoined in parallel.

Figure 13:
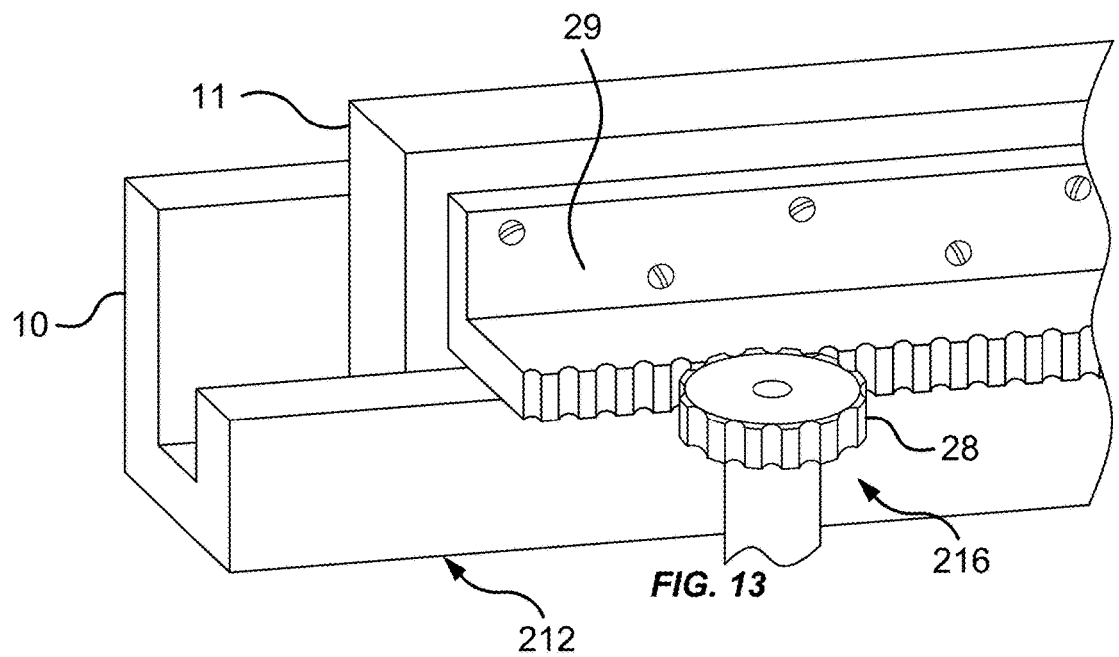
FIG. 13 illustrates a rack and pinion arrangement.
Figure 14:
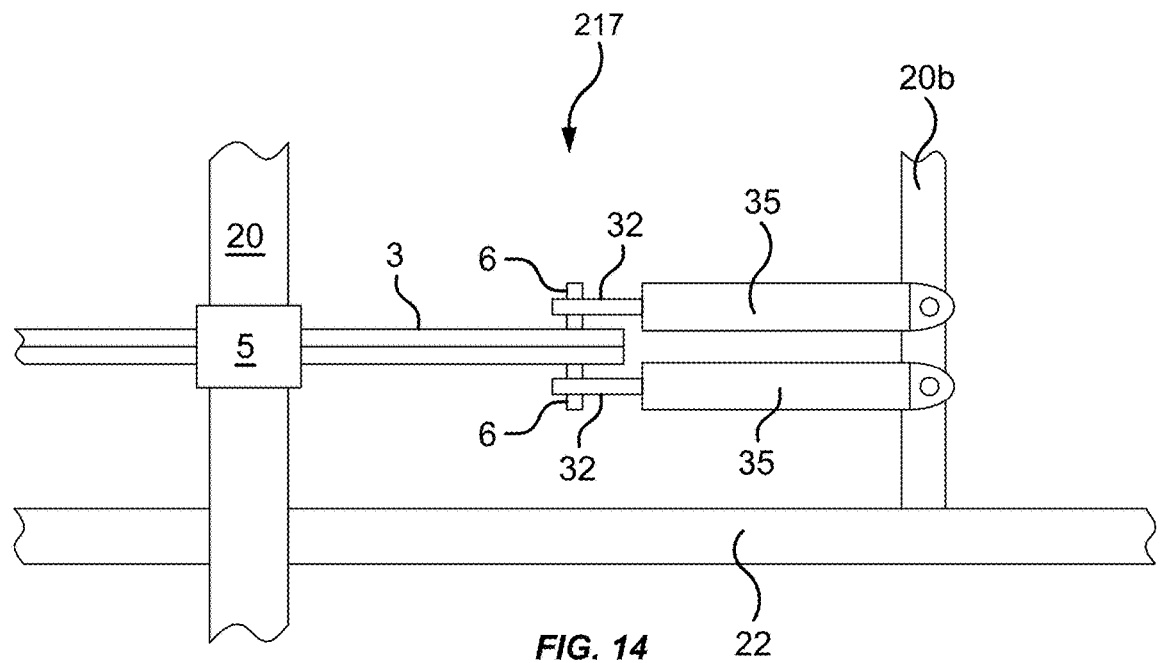
FIG. 14 shows a dual pump arrangement connected to a primary spring.

The above specification describes a system of restraint that relies on resilient mechanical energy storage elements to resist load based displacement. In conjunction with the resilient mechanical energy storage elements, the restraint system 211 may further include dampening system 216, 217. A useful non-resilient means of dampening can be driven by the to-and-fro of the carriage 214 under a reversing load. This, in principle, is a reciprocating engine that may be harnessed to convert load to power, with the load thereby being expended and dampened. Specifically, the restraint system 211 may incorporate elements that harness the engine defined by the reciprocating turbine blade 300 and thereby provide a dampening effect. Referring now to FIG. 13, the dampening system 216 includes a rack 29 and pinion gear 28 arrangement as a means to harness the load that displaces the carriage 214 (not shown in the figure). As illustrated, a gear rack 29 is attached to a slide 11 and in turn engaged with a pinion gear 28 rotatably supported by the framework (not shown for clarity of the drawing). The pinion gear 28 transmits power to a mechanical load in the form of a work-producing apparatus (working apparatus), for example, an air compressor, hydraulic pump or the like (also not depicted for clarity of the drawing). Alternatively, the gear rack 29 can be attached to the edge of a bench 12 and configured to engage a suitably disposed pinion gear 28. Another means to harness the reciprocation of the carriage 214 and dampen that motion is through a dampening system 217 that includes at least one piston and cylinder arranged as a hydraulic or pneumatic pump 35, wherein the pump 35 is powered by the reciprocation of the pin end of a corresponding primary spring 3. Such a dampening arrangement may be installed on some or all of the primary springs 3, to achieve the desired amount of dampening and maintain a balance counter forces on the two opposing sides of the carriage 214. FIG. 14 shows a representative dampening system 217 coupled to a primary spring 3. The mechanical load is formed by an arrangement of two such pumps 35, with the piston rods 32 attached to the pin end of a primary spring 3 and the cylinders 35 being affixed to a framework cross element 20b. The fluid conduits that connect to the cylinders 35 are conventional and not depicted for simplicity of the illustration. Seat 5 is shown attached to framework cross element 20 and a representative framework element 22 are shown.

The rack and pinion arrangement shown in FIG. 13 may be utilized in combination with a torsion spring, with the torsion spring connected between the pinion and a working apparatus. In this combination of resilient restraint and dampening elements, a pinion gear turns against the bias force of the spring, inducing torsion which transmits power to the working apparatus. This embodiment offers a means to briefly store mechanical energy through resilient spring deflection, the power to be transmitted to a working apparatus at a rate determined through a mechanical regulator control known in the art.

Figure 15:
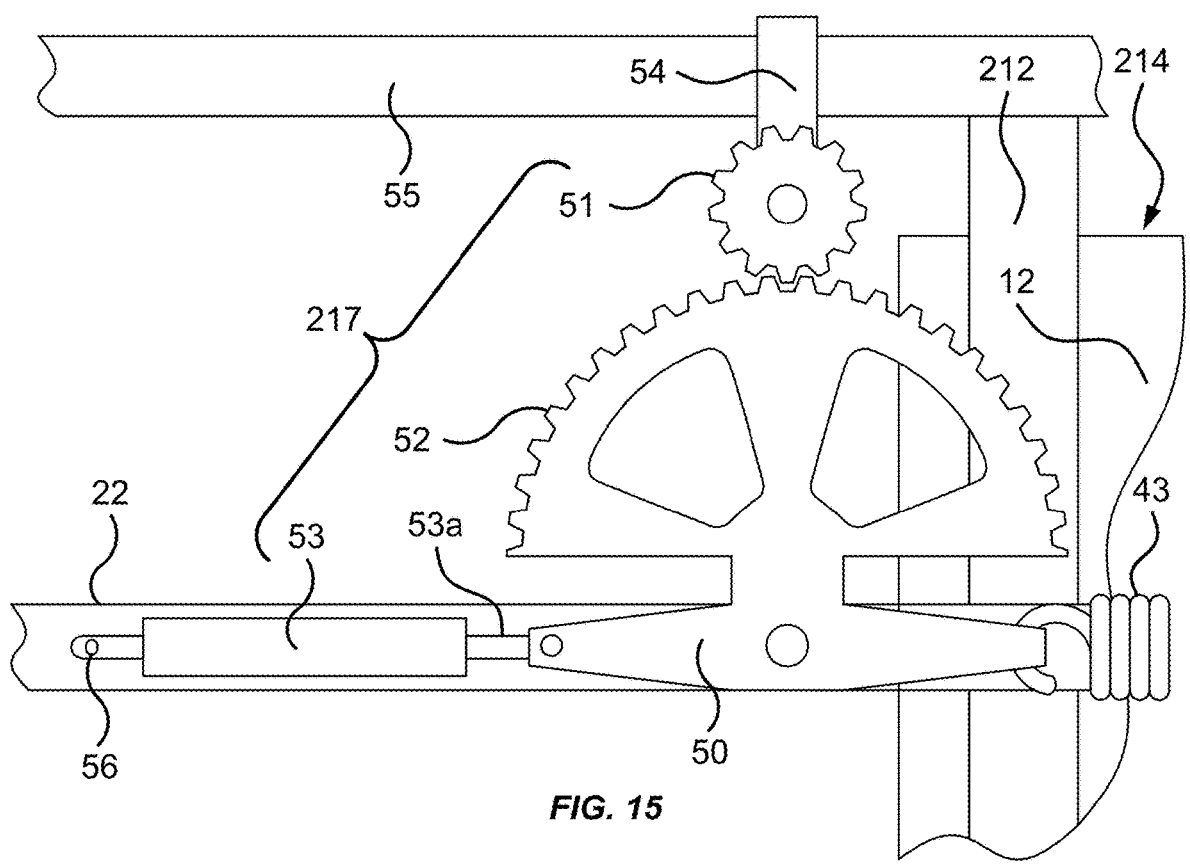
FIG. 15 depicts a pivotal lever set arrangement with a combination of dampening elements.

In a further configuration of a pivotal lever set, resilient restraint and the dampening system 217 are combined, wherein extension coil springs are combined with a pinion/gearwheel dampening arrangement and a hydraulic or pneumatic pump. FIG. 15 shows a lever set 50 providing both resilient restraint and dampening with an attached semi-circular gearwheel 52 which turns a pinion gear 51 that transmits power to a working apparatus as previously described (not shown). Pinion gear 51 is supported by exemplary framework element 55 through attached seat 54, pinion 51 being secured thereat. Further, a hydraulic pump 53 replaces the coil spring 42 of the previously described lever set described with respect to FIG. 10. The pump piston rod 53a is pivotally connected to the lever set 50, and the pump cylinder is pivotally anchored at 56 to framework element 22. As the lever set 50 pivots back and forth, the piston rod is worked (reciprocates) and the pump is thereby powered. Thus, the pinion gear 51 coupled to a load and the hydraulic or pneumatic pump 53 function to dampen the displacement motion coupled to the lever set 50. FIG. 15 shows semi-circular gearwheel 52 as opposite the carriage 214 with framework element 22 interposed, with the bench 12 and tracks 212 partly obscured by the framework element 22 and other parts of the drawing. With the exception of the hydraulic or pneumatic pump 53 and the semi-circular gearwheel 52, a lever set 50 has the same aspects as a lever set 40. The gear wheel 52, pinion gear 51 coupled to a work producing load, and the hydraulic or pneumatic pump 53 together form the dampening system 217 in this arrangement of the restraint system 211.

In another configuration (not shown), a wholly circular gearwheel may be substituted for the semi-circular gear wheel 52. A circular gearwheel provides an arrangement that more easily facilitates more than one pinion gear being engaged with the gear wheel to transmit power from the gearwheel. In such an arrangement, the second pinion gear may be substituted for the hydraulic or pneumatic pump 53, and/or replace the extension spring 43 with a torsion spring, the second pinion gear being arranged to engage the circular gearwheel and transmit power therefrom. A circular gearwheel turns through an arc of about 180 degrees by means of the pivotal lever set arrangement shown in FIG. 10, the same as a semi-circular gearwheel 52.

Thus, the restraint system 211 may include a dampening system 216, 217 having non-resilient dampening elements that are able to also serve to convert load to power, as a secondary power source. The secondary source of power may be usefully applied to the operation of the turbine through electrical, hydraulic, or pneumatic conduits, and/or through mechanical means. The secondary source of power may be applied to a system of propulsion of the turbine, as through the compression of air, which compressed air is stored in an accumulator and released through one or more jet orifices to provide motive torque. Alternatively, the secondary source of power may be applied to heating elements to heat turbine components, such as blades, to prevent the formation of ice under icy winter conditions. Alternatively, the secondary source of power may be applied to the operation of a pivotal turbine blade, as for example, in controlling its pitch. The annular framework provides for placement of all of the components of the dampening system and those required for the utilization of the secondary source of power generated by the dampening system.

Figure 21:
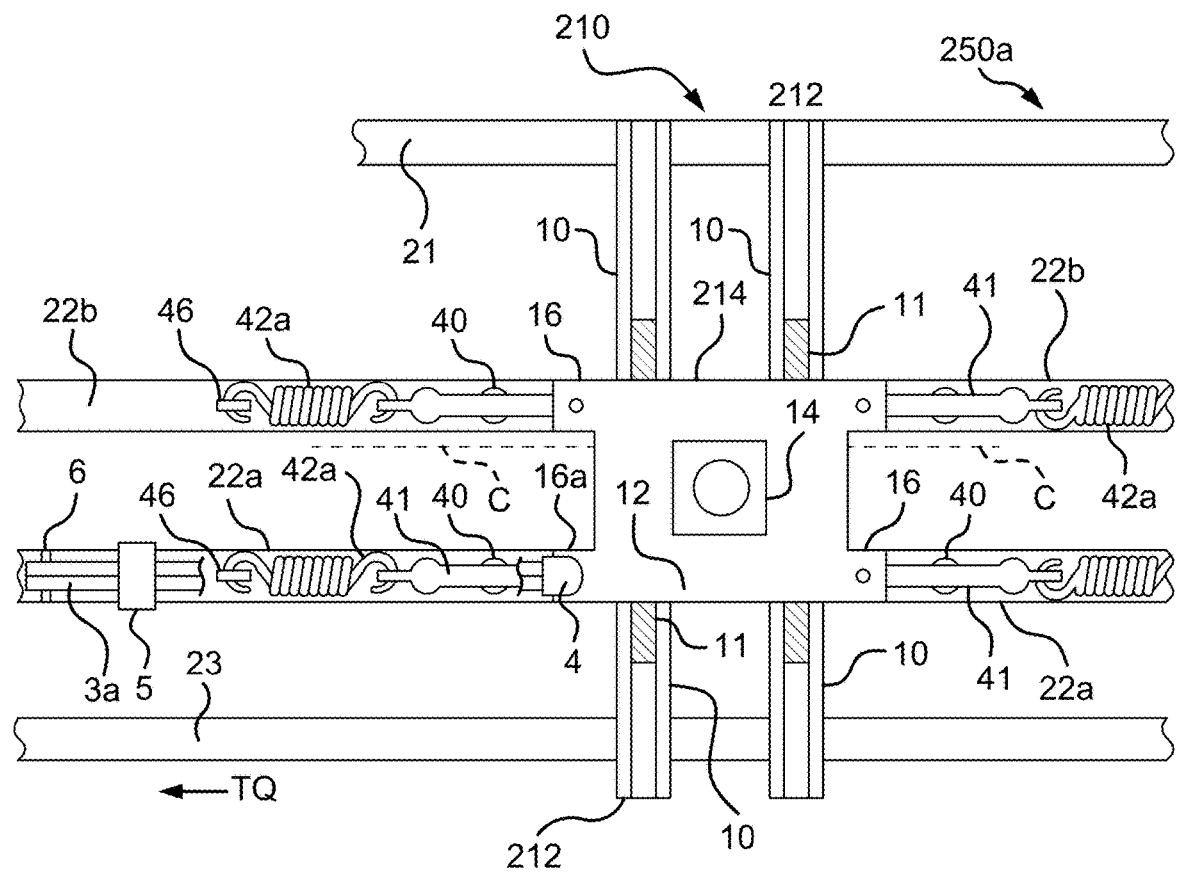
FIG. 21 is a plan view of a carriage at rest position, coupled to four pivotal lever sets.

Referring to FIG. 21 as a modification of the arrangement of FIGS. 1 and 5, there is shown a segment of the lower annular framework 250a with blade mounting unit 210 installed upon four concentric framework elements 21, 22b, 22a, and 23, and further modifications as will be described herein. The arrow labeled TQ signifies the impetus of motive lift. In order to simplify this presentation, auxiliary leaf springs 7, 7a are omitted from the figure. In a further simplification, the view is cropped at the right, eliminating anchors 46 of coil springs 42a at that side. Shown are segments of two middle framework elements 22a, 22b, and two outer framework elements 21, 23, with element 21 representing the outboard side of the turbine and element 23 representing the inboard side. Framework elements 22a, 22b are positioned so to provide a base for the installation of pivotal lever sets 40, wherein each of four lever sets 40 are respectively coupled to a corresponding projection 16 at each corner of bench 12. Framework elements 22a, 22b, as positioned, also provide carriage 214 a rest (or initial) position that is offset from the center of the annular framework, the center signified by dashed line labeled C. The offset is toward the inboard side in compliance with the need for greater restraint against a carriage 214 being displaced centrifugally, toward the outboard side, as explicated in paragraphs above. Thus, FIG. 21 shows carriage 214 disposed between elements 22a, 22b in its rest, or initial, position, the carriage so disposed through the bias of undeflected resilient restraining elements coupled thereto. In FIG. 21, three of the primary springs 3 are not shown coupled to the projections 16 of the bench 12 to reveal the arrangement of the lever sets 40 and secondary springs 42a, while the fourth primary spring 3 is shown partially cutaway between the pivotal clamp 4 connected to the projection 16a of the bench 12 and the primary spring segment 3a to show the dual coupling arrangement at projection 16a as an example of such connection at each of the projections 16. Note that in this embodiment of the blade mounting unit 210, cross element 20 (of FIGS. 1, 3, 5, 6, 7, 8), as a mount for the seat 5, is eliminated, with undeflected primary springs 3 extending straight along element 22a, from pivotal clamp 4 through corresponding seat 5 (attached to 22a for two of the springs 3 and 22b for the other two springs 3) to pin 6. Thus, elements 22a, 22b may also serve in place of cross element 20 as a site for the mounting of the hydraulic pump 35, serpentine spring 38, or seat 5. Framework elements 21 and 23 can likewise serve, respectively, as sites for the attachment of auxiliary spring seats 8, 8a, in place of an extended cross element 20. Similarly, framework element 21 serves for the site of attachment of torsion bar 30 seat 20a in place of the end of cross element 20, shown in FIGS. 7 and 8.

Figure 22:
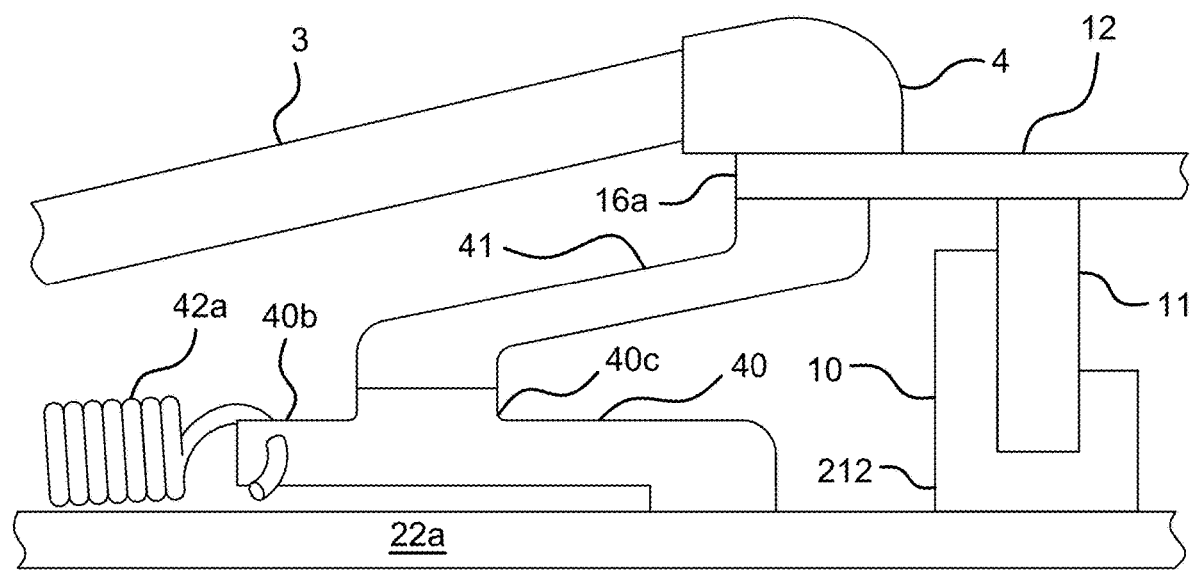
FIG. 22 is an elevation view of a pivotal lever set and a primary spring sharing a coupling.

Referring to the elevation view of FIG. 22, there is shown the dual coupling arrangement depicted in FIG. 21, wherein a pivotal clamp 4 and a coupling arm 41, each, are coupled to projection 16a. Note that pivotal clamp 4 is shown in an inverted coupling position, as compared with its orientation as shown in FIGS. 1, 2, 5, 6, and 8. A similar dual coupling may be arranged at each projection 16 and so augment the resilient restraint against a carriage 214. In order to simplify the presentation of FIG. 22, the counterpart pivotal lever set 40 on the opposite side of carriage 214 is omitted from the view and, likewise, all components of lever set 40 at the opposite side of element 22a are omitted.

The advantages of the disclosed blade mounting system described herein include:
- a displaceable carriage coupled to each end of a pivotal vertically oriented turbine blade;
- a structure accommodating linear displacement of the carriage; and
- a system of restraint that applies a force to the carriage as it displaces.

One skilled in the art will note that the positioning of restraining elements is specified according to the principle of obviating radial load against turbine components, a principle that should be observed insomuch as possible. To illustrate a negation of this principle, referring to FIG. 1, if a compression spring were positioned between a displacing carriage and the outboard framework element, such disposition should restrain the carriage, but load would transmit directly (radially) against the framework member, a circumstance that violates the aforesaid principle.

One skilled in the art will be aware that a system of restraint utilizing resilient means may be devised according to a calculated degree of resilience. For instance, a leaf spring of the above embodiment may be furnished at a specific resilience, that is, a predetermined degree of deflection under a specified load. In practice this must be done, in order that the capacity of a system of restraint be determined, as turbine blades must be designed according to the maximum capacity of restraint afforded by a blade mounting system.

Frictional effects sustained by elements of the disclosed blade mounting system may be addressed through lubricants and/or the use of low friction material, such as Babbitt metal. For example, low friction material could be used to provide a jacket for a primary spring reserve length, to facilitate its movement through a seat 5. The bearing surface of a seat 5 likewise could be of such material, or roller bearings may be used. The problem of wear should be relieved through periodic applications of lubricant, as needed. The bench 12, or a framework element, may support a reservoir for lubricant, to be applied through conduits and wicks devised for such purpose. A sealed bearing race may be used in a blade pivot. Weather shields should be provided at points critically affected by precipitation or ice formation. Where appropriate, insect screens should be provided against infestation by insects.

As stated above, the present invention has the object of enabling the achievement of a vertical axis wind turbine suitable for the generation of power on a utility scale. The invention originated within the context of designing such a VAWT system, with the present invention being exemplary of that system. The subject VAWT system is unlike the type of VAWT known as a Darrieus turbine, whose blades are few and centrally supported. The subject VAWT system is conceived as having numerous blades suspended in a substantially annular framework or one that is polygonal, with the framework rotatably supported from beneath rather than centrally; specifically, the lower framework is rotatably supported on an elevated circuit path at a height substantially above the ground-level wind shear. A blade is suspended between upper and lower members of the framework, pivotally coupled at each end to the disclosed blade mounting system, both upper and lower framework members providing elements suited to the support of that system. Secured in the disclosed mounting system, a turbine blade is integral to the framework and provides support to the upper framework member. Rotor arms extend from the axis of rotation to join the lower framework member, with bracing provided to the framework at the junction thereof and additional bracing provided as needed. As the subject VAWT system was conceived, blades are spaced in the framework at angularly spaced intervals determined as optimal by aerodynamic considerations. A representation of the subject turbine should present to the eye a cylindrical assembly of substantially vertical blades rotatably supported on an elevated path to a height above ground level.

Figure 26:
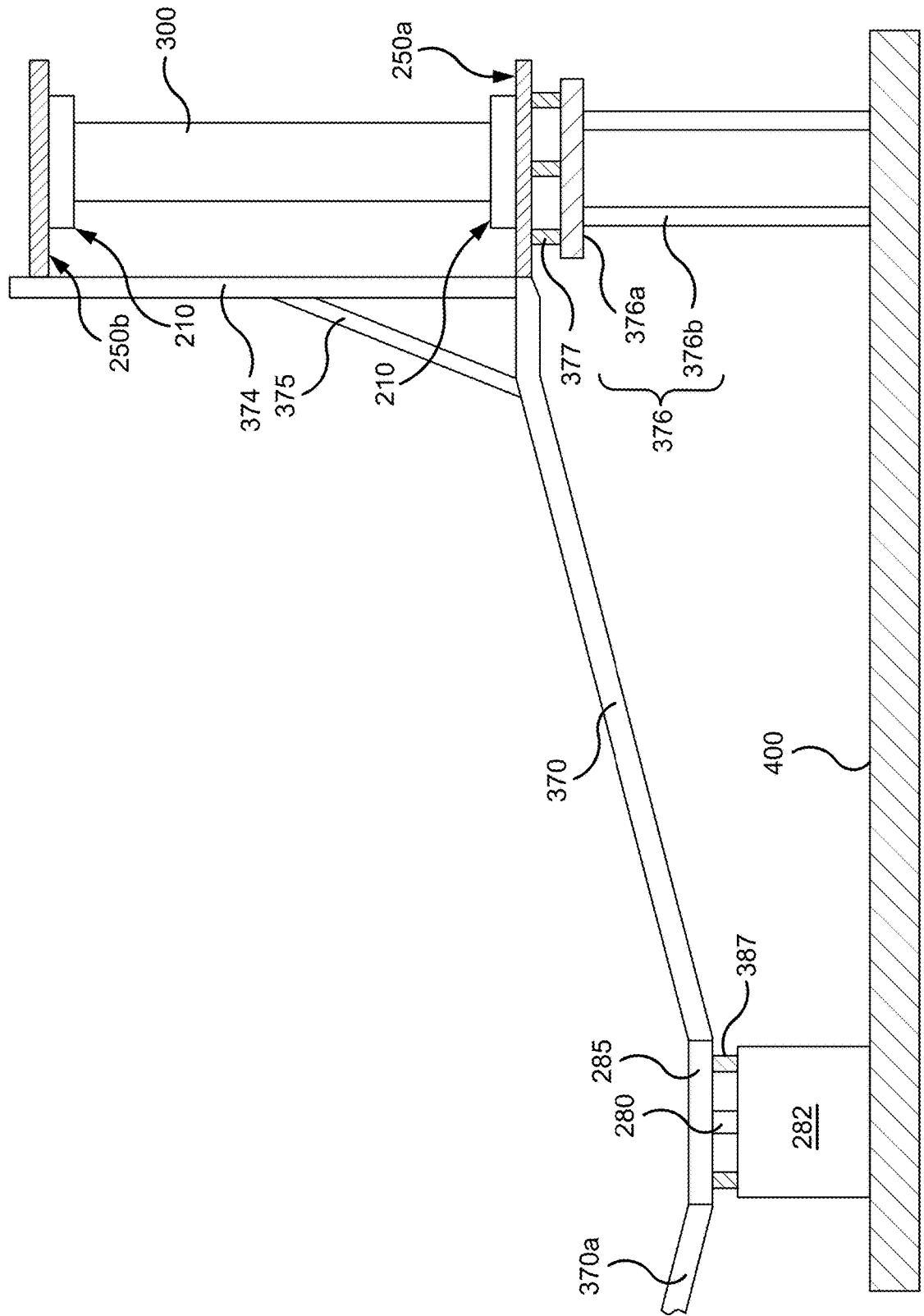
FIG. 26 is a schematic representation of the supporting structure of the vertical axis wind turbine of the present invention.

FIG. 26 presents the structural, rotative and other aspects of the subject VAWT in a simplified form. A housing structure 282 is shown to include a rotational shaft 280 extending therefrom and installed at the axis of rotation of the VAWT. The housing structure 282 includes a generator (not shown) or provides the necessary mechanical connection to a remotely located generator, and may also include reduction gears (not shown) enclosed therein. The hub 285 is attached at the upper end of the rotational shaft 280 for rotation of shaft 280 therewith. Hub 285 is rotatably supported on housing structure 282. A plurality of rotor arms 370, 370a extend between the hub 285 and the lower framework 250a, with the rotor arms 370 being diametrically opposed to the rotor arms 370a. The plurality of rotor arms 370, 370a are radially directed and angularly spaced one from another like the spokes of a wheel. The number of rotor arms 370, 370a is determined by the size of the VAWT and the structural requirements thereof, and by their arrangement of being spaced between adjacent blade mounting units 210. The simplified drawing of FIG. 26 shows a single representative rotor arm 370 joining the hub 285 at one end thereof and the lower framework 250a at the opposing end. The opposing rotor arm 370a, which extends at an angle of 180 degrees from the illustrated rotor arm 370, likewise joins the hub 285 to the lower framework 250a, but is shown truncated in the simplified view. The upper framework 250b is supported on the lower framework 250a by a combination of the plurality of turbine blades 300 coupled at each end to corresponding blade mounting units 210 and a plurality of additional vertical structural elements 374, each extending from a position at or near the junction of a respective one of the plurality of rotor arms 370, 370a and lower framework 250a. Each vertical structural element 374 is braced as may be structurally required. For example, the representative vertical structural elements 374 shown in FIG. 26, is braced by a bracing structural element 375 extending obliquely from the rotor arm 370 to the structural element 374. This structural arrangement is repeated at each junction of a rotor arm 370, 370a with the lower framework 250a. As previously disclosed, the structural elements 374 and 375 may be replaced by a truss structure extending between the rotor arms 370, 370a and the upper framework 250b, or between the lower and upper frameworks 250a and 250b. Lower framework 250a is supported on rotative elements 377 (shaded), these being supported on a circumferential elevated path structure 376, this being an elevated path 376a supported by a plurality of columns 376b. Elevated path 376a is supported at a height substantially above the wind shear associated with the ground 400. Rotative elements 387 support hub 285 on housing structure 282. The upper and lower frameworks members 250a and 250b, and the elevated path 376a are shown in cross-section.

FIG. 5 is a perspective view of a pivotal blade 300 suspended within an annular framework 250, between the upper framework 250b and lower framework 250a, radially displaceable and supported by the mounting system 200. Each end of the blade 300 being supported by a respective blade mounting unit 210 of the disclosed mounting system 200. The view is from a position above and outboard of the upper framework 250b and represents the disclosed blade mounting system 200 in a working capacity. Portions of adjacent blades are included in the view, mounted at their distal ends in a like manner for context. The near end of the turbine blade is shaded, to distinguish it from the rest of the drawing. Likewise, the carriage bench is distinguished by stippling. As the structure is symmetrical, inverting the drawing of FIG. 5 presents a reversed view, looking upward from below the lower framework member. In FIG. 5, some details of the disclosed blade mounting system are omitted due to scale. Also, to a great extent, the components of the secondary mechanical energy storage assembly 215 are omitted for simplicity, so other components can be more clearly viewed. Turbine components such as rotor arms and an elevated pathway are not depicted. Otherwise, FIG. 5 shows the disclosed blade mounting system 200 within the context of the framework of a novel VAWT system.

In the subject VAWT system, blade design is subject to the need to limit the load generated at a blade, with reference to the restraining capacity of the disclosed blade mounting system, which should not be exceeded. In other words, blade characteristics determine the load generated against the system of restraint and therefore blade design must be constrained by such capacity as a system of restraint affords. Blade design, particularly dimensions and weight, will be moderated by such constraint.

To gain a full grasp of the principle of design stated above, it is helpful to examine the interplay of the disclosed blade mounting system with blade design and turbine dynamics. This interplay may be examined through the hypothetical instance of a 30 mph wind and a turbine rotating at the same speed, 30 mph. In this instance, the maximal component of lift directed centrifugally may be computed as a load of about 100 pounds per square foot. By this figure, a turbine blade with an 8 foot chord and thirty feet of height and computed at 240 square feet of lift surface, generates a maximum centrifugal load of 24,000 pounds, as a component of lift. If, in this instance, the turbine blade weighs 2,000 pounds and a centripetal acceleration factor is computed at 6.1, then a centrifugal force due to rotation may be computed at 12,200 pounds. These loads add to 36,200 pounds of centrifugal load, occurring as a cyclic load against the disclosed system of restraint. If, in this instance, a system of restraint rated at 17,500 pounds maximum capacity were installed at each end of a blade, for a total maximum capacity of 35,000 pounds, the load calculated against the system of restraint exceeds its rated capacity by 1,200 pounds. To deal with the prospect of such an overload, a blade may be redesigned at a reduced scale, or the turbine may be operated at a lower speed, or the blades set at a less efficient pitch, each measure resulting in a reduction of load against the system of restraint. Alternatively, more capacity may be added to the system of restraint; or it may be determined that the excess load is within turbine structural tolerances and that the framework should absorb the load without harmful effect. The above hypothetical instance demonstrates that blade design, and turbine design and turbine operation, as well, are predicated on the capacity of restraint of the blade mounting system.

In general, the power rating of a wind turbine is a function of its total area of lift surface. The subject VAWT system achieves a large area of lift surface through numbers of blades, this made feasible through an annular framework rotatably supported from below, which method of support provides for a multiplicity of blades. As a method of removing the turbine from the wind shear associated with the surface, the annular framework is rotationally supported on an elevated path, with the upper framework member supported upon the lower member. Turbine speed should be governed by generator torque, as over-speed leads to excessive loads and less efficient turbine operation. A pivotal blade is operated to achieve optimal aerodynamics. When severe wind threatens, the risk of damage can be avoided through setting blades at the stall angle, which blade disposition suspends the operation of the turbine. The threshold of risk is set by the capacity of a system of restraint.

Besides the blade mounting, the blade itself is an important element of a VAWT system. An airfoil blade of a vertical axis wind turbine is subject to a reversing airflow as it progresses through its circuit, moving with the wind through one leg of its circuit, and then counter to the wind in the next leg. Because of this reversing airflow, a VAWT blade meets a problematic, back-and-forth aerodynamics as it completes a circuit. This problematic aerodynamics is addressed in the prior art by utilizing an airfoil turbine blade with camber on both sides, which dual camber generates lift on either side and so accommodates the back-and-forth aerodynamics to good effect. However, the dual camber blade is not a highly efficient airfoil, in terms of lift-generating capacity, and turbine performance is handicapped by such lack of efficiency at the blade.

The blade of a VAWT is subject to an airflow of low velocity, as compared, for example, to the wing of an airplane. For low velocity airflow, a more efficient airfoil has a single-camber with a concave obverse. Heretofore, deployment of a single-camber blade was not feasible in a VAWT, due to that category's problematic aerodynamics as it makes the circuit.

As will be seen in following paragraphs, a single-camber airfoil blade designed for deployment in a vertical axis wind turbine will be described that overcomes the problematic aerodynamic forces that had prevented use of single-camber airfoil blades in the past. The disclosed blade is pivotal, with additional operative aspects, including internal appliances that shape camber. By that arrangement, the blade is operated to advantage, presenting camber oppositely, from one lateral edge to the other, and back, as it completes a circuit. Thus, the blade alternates the disposition of its camber in accommodation of the reversing aerodynamics, with consequent improvement in turbine performance.

Alternating the lateral (in the direction of the chord of the airfoil) disposition of camber involves a dual operation, wherein 1) the chord of a blade is pivoted through an obtuse angle, and 2) the internal appliances are operated to reverse the profile of a blade, with the blunt nose and trailing edge exchanging positions on the blade. Blade profile is determined through two operative features of the disclosed blade: 1) an exterior surface that is pliable and formable to produce the camber, and 2) foldable, flap-like appendages articulated along the length of a blade at both opposing edges. These two features are brought about by internal appliances in the reversing of blade profile. In another operative aspect, the disclosed blade is pivotally adjusted to maintain it at optimal pitch with respect to the apparent wind. The operation of the disclosed blade is through a system of controls responsive to wind metrics.

Figure 16:
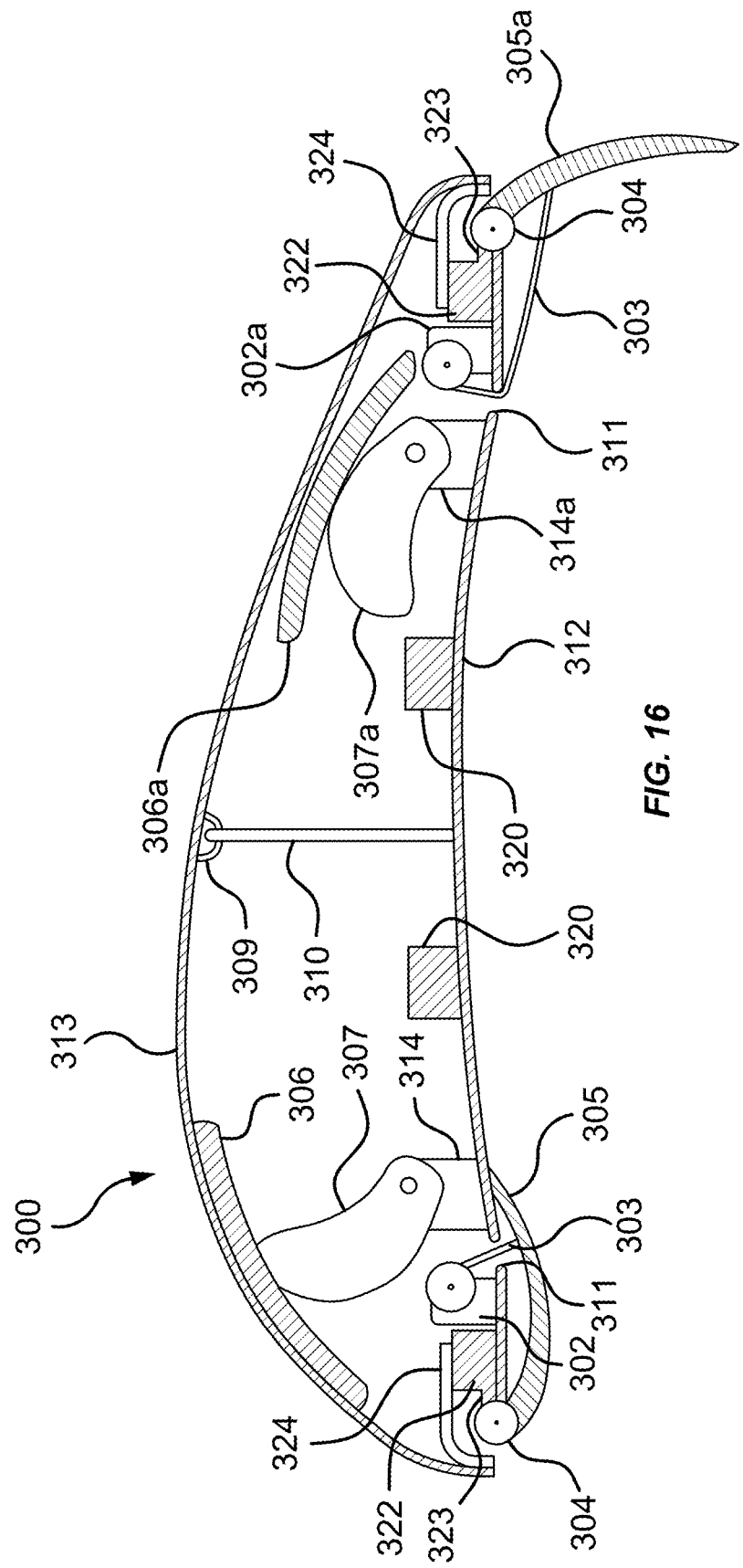
FIG. 16 presents a sectional view of the turbine blade of the present invention and the internal appliances thereof.
Figure 17:
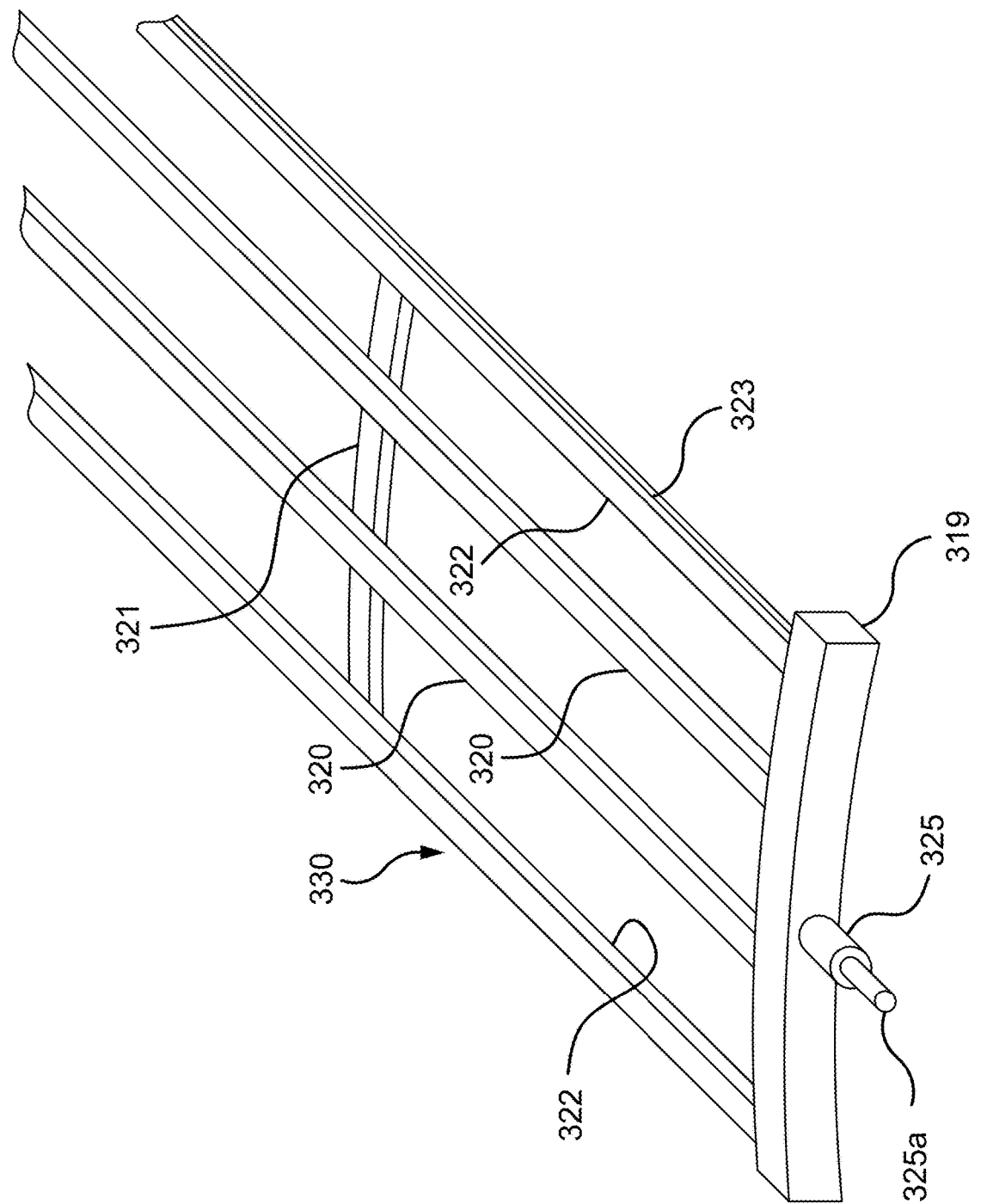
FIG. 17 shows the blade framework of the turbine blade of FIG. 16.
Figure 18:
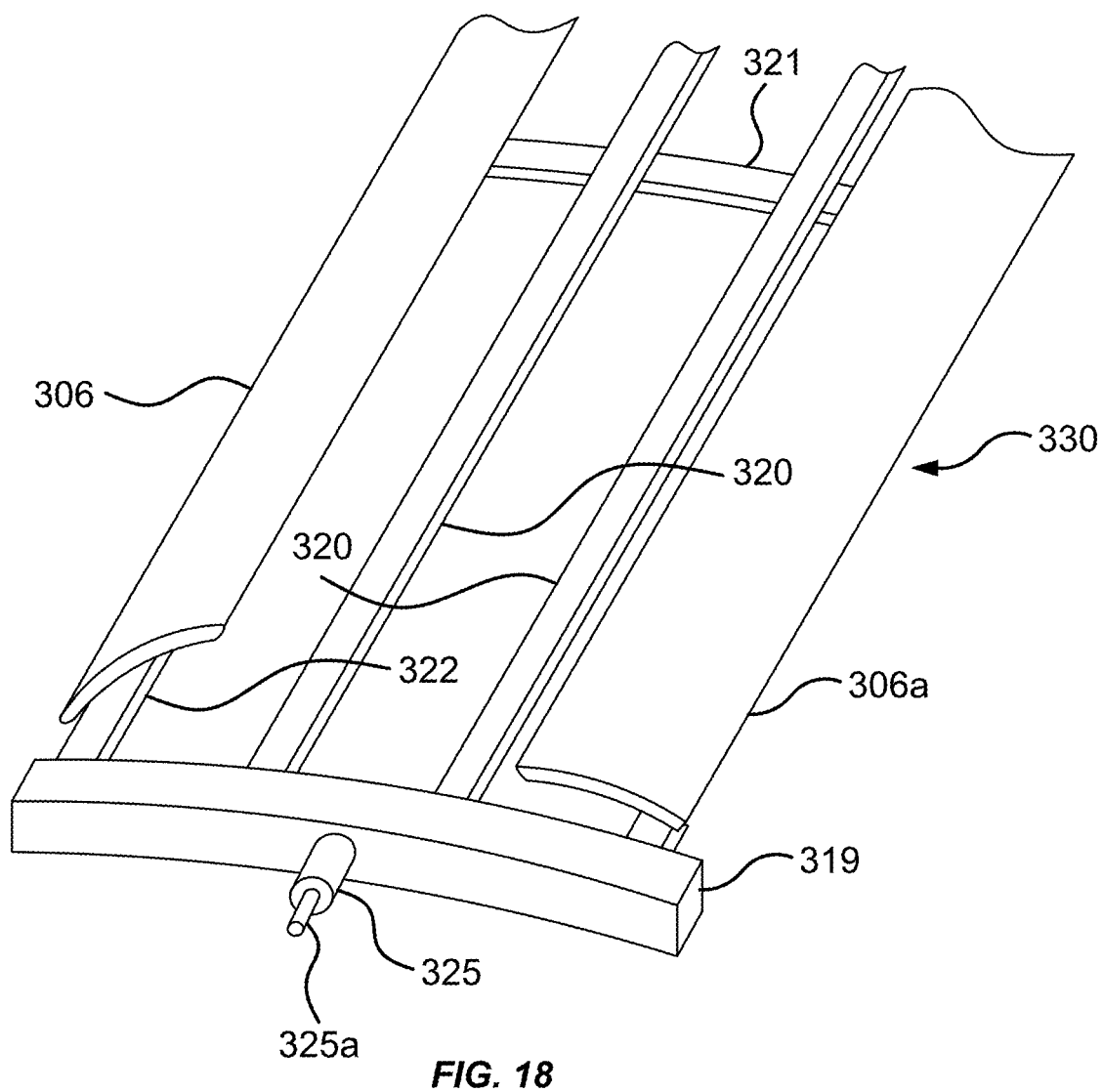
FIG. 18 presents a three dimensional view of the contoured forms overlaying the framework of FIG. 17.

Referring now to FIGS. 16 and 17, the disclosed turbine blade 300 is constituted of a framework 330 with an exterior affixed thereto. The framework 330 of the blade 300 consists of longitudinal elements or spars, two inner spars 320 and two outer spars 322, fixed at each end into a frame-stock 319. Each of the spars 322 has an extended portion 323 for coupling to a hinge 304 that joins the flap-like appendages 305 and 305*a* to the blade 300. Each frame-stock 319 has a respective axial shaft 325 extending therefrom to form the blade pivot and, through a stepwise reduction of its diameter, pivot extension 325*a*. Transverse ribs 321 join framework spars 320, 322 and are spaced one from another longitudinally throughout the length of the blade. FIG. 16 shows longitudinal elements 320, 322 in cross-section and FIG. 18 provides a view of the framework 330 partially obscured by contoured forms 306 and 306*a*. FIGS. 17 and 18 show a frame-stock 319 with an axial shaft 325 forming the blade pivot at its center, such centering of the pivot axis being necessary for proper operation of the blade. As designed, the disclosed blade 300 is suspended at a substantially vertical attitude, pivotally coupled at both upper and lower ends within the framework 250. The blade is most advantageously deployed in a turbine designed with a framework rotatably supported from beneath that framework.

The exterior covering of blade 300 is pliable on one side and rigid on the other; the cambered side 313 is pliable and the concave obverse side 312 is rigid. Referring to FIG. 16, each lateral edge of the pliable cambered side 313 is fastened to a bracket 324 that is in turn attached to and extends from the corresponding one of the two outer spars 322. The pliable side 313 is thus secured to the outer edges of framework 330 (best seen in FIG. 17) and spans the interval between the outer spars 322 unfastened, except at a mid-line thereof by a tether 310, described below. The pliable exterior 313 is shaped by appliances 306 and 306*a* within the blade, as will also be described below, with the camber of the blade formed and reversed by displacement of those appliances against the under-surface of the pliable exterior side 313. The appliances include two identical contoured forms 306 and 306*a* that extend the length of a blade adjacent to each transverse edge. Each contoured form 306, 306*a* is fixed along its respective midline to the under-surface of the blade pliable exterior side 313 to secure it in position.

FIG. 16 reveals the disclosed turbine blade 300 as having an asymmetric cross-sectional contour, having the pliable cambered side 313 and an obverse concave and immutable side 312. In the cross-sectional view, the contoured form 306 is in an "engaged" position where it is forced against the under-surface of the pliable side 313 to alter the contour thereof, and its counterpart 306*a* disengaged therefrom, allowing that portion of the pliable side to be in a relaxed uncambered state. FIG. 18 shows the contoured form 306 in the engaged position, and its counterpart 306*a* disengaged from the blade's under-surface but otherwise identical to form 306. Other elements of the blade are omitted for clarity. Referring back to FIG. 16, as shown, where contoured form 306, 306*a* engages the under-surface of the pliable covering, that edge of the blade 300 assumes the blunt airfoil nose of the airfoil leading edge, and where a contoured form 306, 306*a* is disengaged from the pliable exterior covering, that edge assumes the taper of the airfoil trailing edge. At any particular moment, only one of the two contoured forms 306, 306*a* is engaged against the pliable under-surface, with the counterpart contoured form being disengaged, and thereby controlling the camber profile of the blade airfoil. The camber profile is reversed by the disengagement of the one contoured form, previously engaged, and the simultaneous engagement of its previously disengaged counterpart, which operation transposes the blunt airfoil nose to the opposite trailing edge. By that operation, leading and trailing edges exchange positions on the wind turbine blade 300.

FIG. 16 depicts an exemplary method of displacing a contoured form 306, 306*a* and a corresponding portion of the pliable covering therewith, and the return of the contoured form 306, 306*a* to allow the pliable covering to return to a relaxed condition. The exemplary method uses at least one swivel cam 307, shown swiveled to displace the contoured form 306 and the corresponding portion of the pliable side 313 therewith. The form 306 is thereby pressed against the under-surface of the pliable side 313 to stretch the that portion of the pliable material to form the enlarged nose (leading edge) of the blade 300. The exemplary method further uses at least one swivel cam 307*a*, which cam is an identical counterpart to cam 307, but rotated and operated oppositely to that of cam 307. Therefore, when cam 307 is positioned to displace the contoured form 306, the cam 307*a* is positioned so as to not apply force against the contoured form 306*a* and thereby provide the blade trailing edge contour. Each cam 307, 307*a* is rotated by means of a respective motor driven swivel mechanism 314, 314*a* controlled by the system of controls described in paragraphs below. When the swivel mechanisms 314 and 314*a* are operated to reverse the positions of the cams 307, 307*a*, the contoured form 306*a* is pressed against the under-surface of the pliable side 313 to stretch the that portion of the pliable material to form the enlarged leading edge on the opposing edge of the blade. Meanwhile, the cam 307 is rotated to remove force against the contoured form 306 and thereby establish the trailing edge of the blade where the leading edge had previously been formed. Thus, the blade 300 is able to reverse the direction of its airfoil through operation of the swivel mechanisms 314 and 314*a* to oppositely position the cams 307 and 307*a*. Cams 307 and 307*a* and their corresponding swivel mechanisms 314 and 314*a* are placed in longitudinal spaced relationship along the length of a blade 300, the spacing being at intervals, as required, and operating simultaneously in transposing the leading and trailing edges of the airfoil of the blade 300.

Alternately, the cams may be swiveled by pivot rods extending the length of the blade, one rod extending adjacent each lateral side of the blade, with multiple cams 307 attached to one of the rods and similarly multiple cams 307*a* attached to the other rod. The rods are each pivoted by a respective motor, such as a servo motor or stepper motor, at one end of a blade, or alternately, may be located centrally in the blade to rotate the single pivot rod or a pair of oppositely directed pivot rods for each set of cams. The motors are controlled by the system of controls described in paragraphs below. As each pivot rod (or pair of pivot rods) is pivoted by its respective motor, all attached cams rotate simultaneously. This arrangement eliminates the need for individual swivel mechanisms 314, 314*a* at each location of the cams 307 and 307*a*.

In another exemplary embodiment, not depicted, a mechanical cam shuttles on internal tracks, the tracks extending between the two edges of a blade, with the cam alternately engaging each contoured form against the pliable exterior covering as it shuttles back and forth. The shuttle cam arrangements are likewise placed at longitudinally spaced intervals within the blade, sufficient to properly operate the contoured forms. In yet another exemplary embodiment, not shown, a cam is fixed at each end of a mechanical arm extending transversely across the blade interior. The arm shunts between the two contoured forms 306 and 306a, engaging one cam against a contoured form as it disengages the other cam, and thus the blunt nose of the blade is transposed back and forth between the two opposing edges of blade 300. Such mechanical arms are spaced at intervals, longitudinally along the interior length of a blade, sufficiently so to properly control operation of a blade. In a further exemplary embodiment, also not shown, inflatable packing takes the place of cams. The inflatable packing extends longitudinally along and against a corresponding contoured form 306, 306a, and arranged to inflate and engage the corresponding contoured form 306, 306a against the under-surface of a pliable exterior 313, or deflate and disengage the same. The inflation/deflation of the packing is subject to the system of controls which inflates the packing, as needed, via conduits leading from compressed air reservoir tanks sited on the annular framework; or opens operable valves to allow the packing to exhaust and deflate.

In FIG. 16, the foldable appendage 305 is shown folded and the other foldable appendage 305a is shown unfolded. These identical appendages extend along opposite lateral edges of the blade 300 from one longitudinal end to the other, each being articulated to the blade by a respective spring-loaded hinge 304, 304a. The spring-loaded hinges 304 and 304a are each coupled to a corresponding outermost spar 322 of the wind turbine blade 300 by an extended portion 323. The appendages 305, 305a are respectively operated in coordination with the reversing of blade profile, with the previously folded appendage 305 being unfolded and extended, while its previously extended counterpart appendage 305a is folded. Thus, the disposition of the two appendages 305, 305a are thereby reversed in coordination with the change in airfoil contour reversal interposing the leading and trailing edges of the wind turbine blade 300.

As an appendage 305, 305a is folded, it folds against a spring bias force of the corresponding spring-loaded hinge 304, 304a, the folding is accomplished by means of a powered spool 302, 302a that winds a flaccid coupling line 303 coupled between the spool 302, 302a and the corresponding appendage 305, 305a. The powered spools 302 and 302a are motor driven and operated in concert with the appropriate one of the swivel mechanisms 314 and 314a, and controlled by the same control system to displace one appendage 305, 305a to the folded position and the other appendage 305a, 305 to the extended position, as appropriate. The flaccid coupling line 303 may be formed by a cable or cord formed of one or more materials known in the art to have sufficient strength and flexibility to provide a service life commensurate with that of the wind turbine blade 300. The appendages 305, 305a are unfolded by means of spring bias force of a respective spring-loaded hinge 304, 304a, which force extends the appendage as the corresponding spool 302, 302a is pays out the coupling line 303 wound thereon. The appendages 305, 305a are folded by means of the corresponding spool 302, 302a winding the coupling line 303 coupled thereto against the spring force of the corresponding spring-loaded hinge 304, 304a. Each coupling line 303 passes through a corresponding aperture 311 formed through the rigid side 312 of the wind turbine blade 300. The powered spool arrangement, just described, is duplicated at longitudinally spaced intervals along the length of the blade 300, as needed to control the appendages. In the folded position, the folded appendage 305, 305a perfects the contour of the leading edge of the blade, and in the unfolded position, the appendage 305, 305a performs like the flap at the trailing edge of an airplane's wing, that of increasing lift of the blade 300 with reduced airflow (reduced air speed). The appendages 305, 305a may be slotted like that of the flaps of conventional aircraft.

In yet another method of operating appendage 305 and 305a, using an arrangement similar to that described above for operation of the cams 307, 307a, a pivot rod extends the length of a blade at each lateral side of the blade 300. Each appendage 305, 305a is attached along the length of the corresponding respective pivot rod, the rod thereby substituting for the hinge 304, 304a. Each rod is pivoted by a motor at one end of a blade, responsive to the system of controls described in following paragraphs. This method eliminates the need for driven spools 302, 302a and flaccid coupling lines 303.

The cambered side 313 of the blade 300 should be formed of a material that is pliable, durable, resilient, and elastic so as to be formable into a firm contour, not alterable by wind loading. The material should bend into a resilient bow and straighten as the bending force is relaxed, as for example, a flexible sheet of plastic or other polymeric material. A supple material such as sailcloth would not serve, unless it were reinforced and suitably stiffened; as for example, impregnating a fiberglass fabric with a polymer compound. Alternatively, a supple material may be reinforced by another material laminated thereto, such as a sheet of flexible plastic, or strips of the same, adhesively or otherwise bonded to the supple material.

Figure 19:
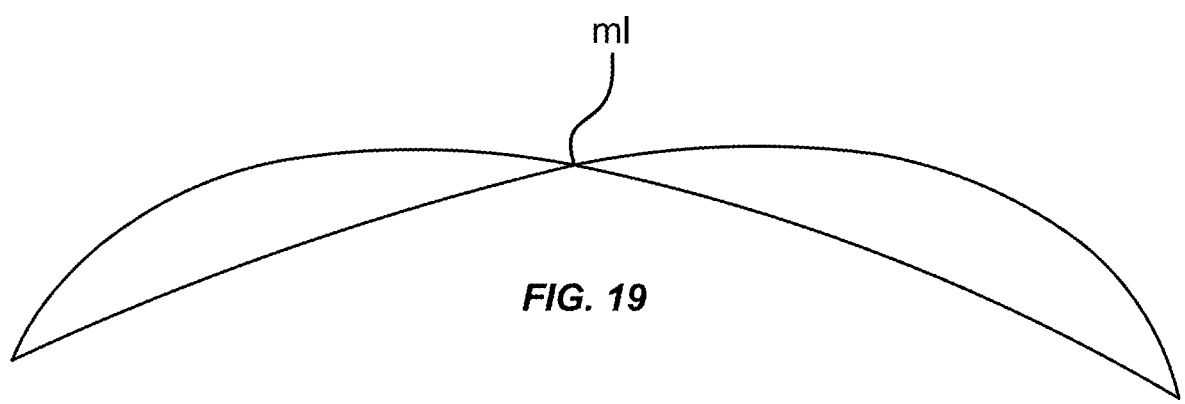
FIG. 19 illustrates the determination of the camber midline.

To prevent distortion of the camber through the force of lift, a tether rod 310 connects the mid-line eye (connection point) 309 to a point opposite the mid-line on the rigid side 312 of blade 300. By that arrangement, the mid-blade exterior is anchored, and camber is thereby held true. FIG. 19 shows the determination of the camber mid-line ml, located at the intersection of two opposed blade profiles, where the mid-line eye 309 is fixed. It may be noted that the mid-line is nearly constant with each reversal of camber profile, although not perfectly constant. Therefore, the tether arrangement should accommodate a slight shifting as camber profile is reversed back and forth, as may be accomplished by a slot formed in the eye 309. The tether arrangement is also duplicated at longitudinally spaced intervals along the mid-line of the blade 300.

Figure 23:
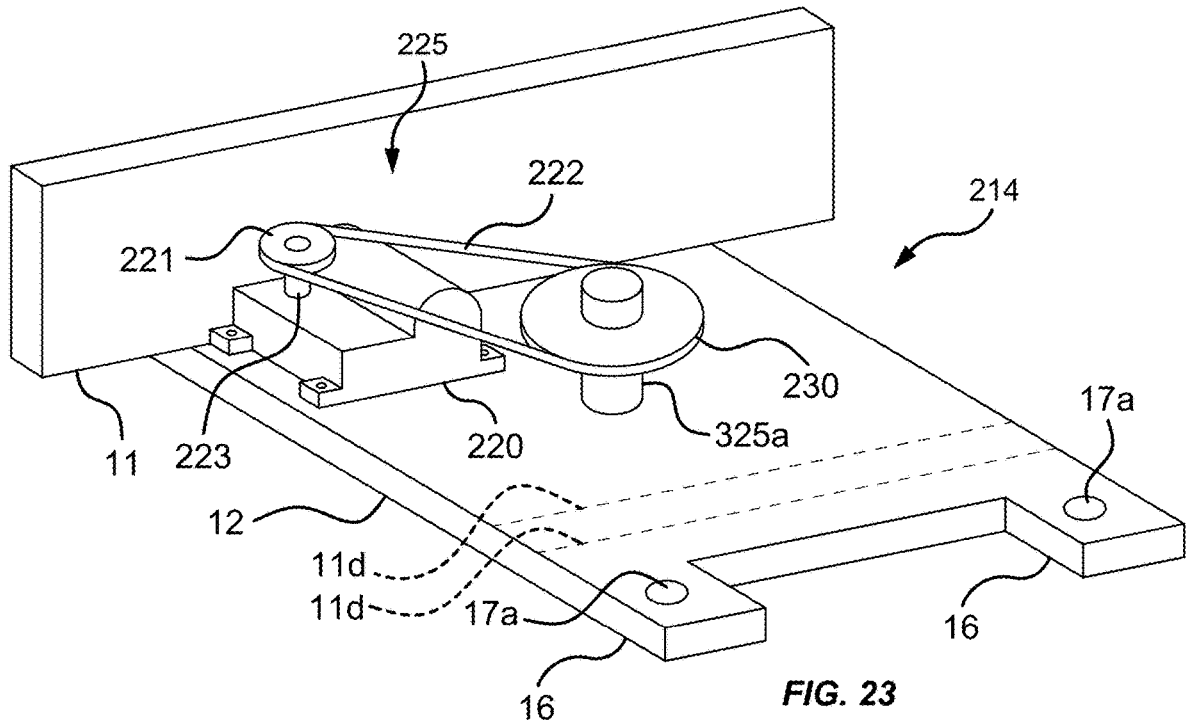
FIG. 23 shows a motive arrangement for pivoting a blade.
Figure 24A:
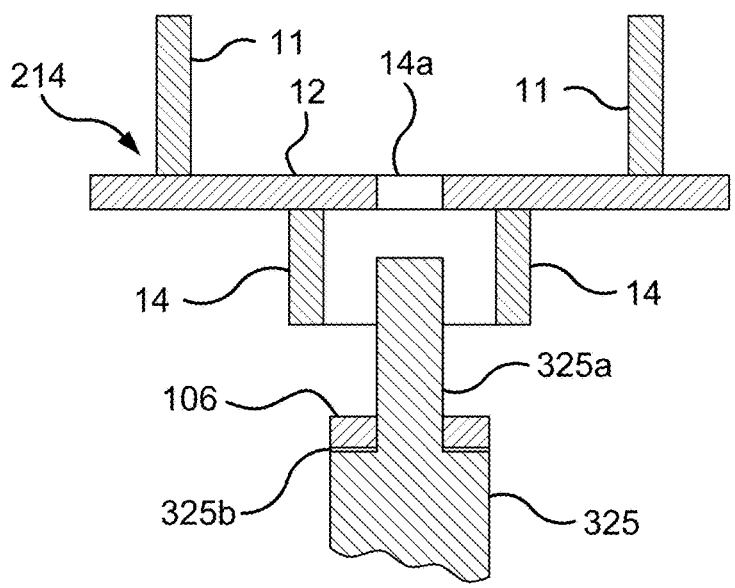
FIG. 24a is a cross-sectional exploded view of the blade pivot and carriage.
Figure 24B:
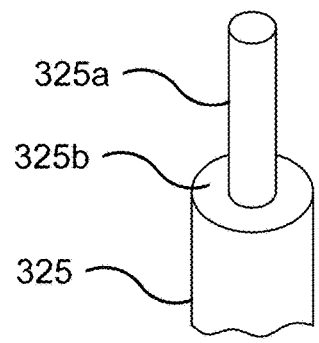
FIG. 24b is a perspective view of the blade axial shaft and blade pivot extension.

Referring to FIG. 23, a rotational drive system 225 of pivoting a turbine blade 300 is an included of at least one of the pair of mounting units 210, 210. As depicted, the bench 12 of carriage 214 and one of the pair of slides 11 of an upper blade mounting unit 210, is shown and oriented for installation at upper framework 250b. Omitted from the view is the second slide 11, however, its position on the bench 12 is identified by a pair of parallel dashed lines 11d, 11d. The rotational drive system 225 includes a motor 220 mounted on the bench 12, which motor may be electrically, pneumatically, or hydraulically powered via conventional connections, not shown for clarity of the drawing. The motor 220 rotates a blade 300 (not shown) by rotating a motor output shaft 223 and the attached drive sprocket wheel 221 which in turn displaces a drive chain 222. The drive chain 222 being coupled to a driven sprocket wheel 230 that is coupled to the pivot extension 325a of the blade 300, thereby rotates the pivot extension 325a, and the blade 300 therewith. As pivot extension 325a is a coaxial extension of blade pivot 325, as shown in FIGS. 24a, 24b, the blade 300 is rotatively driven The above component of the rotational drive system 225 may be installed on the carriage 214 of either one of the two mounting units 210, or further include two sets of motors 220, drive sprocket wheels 221, drive chains 222 and driven sprocket wheels 230 for respective mounting to the carriage of each of the two mounting units 210 for the blade 300. Inverting the illustration of FIG. 23 presents a view of the rotational drive system 225 as installed on a carriage 214 of the mounting unit 210 that is installed on the lower framework 250a to support the opposing end of a blade 300.

Referring to FIG. 24a, an exploded cross-sectional view of the blade pivot 325, pivot extension 325a, and the carriage 214 with the bench 12, receptacle 14, and slides 11. At the center of receptacle 14, a coupling opening 14a is provided to pivotally mate with the pivot extension 325a, through which pivot extension 325a extends to the opposite side of bench 12. The pivot extension 325a is coaxial to pivot 325, being formed as a step reduction in the diameter of pivot 325, as also shown in FIG. 24b. The step reduction forms an annular shelf 325b at the foot of extension 325a, which shelf is the bearing surface of pivot 325. Fitted to shelf 325b is a bearing race 106 through which the pivot extension 325a passes. This pivotal arrangement is provided for both ends of each blade 300.

In operation, the disclosed blade 300 resolves the problematic aerodynamics of a VAWT by means of the dual operation of blade 300 which is performed at each of two cardinal points on the circuit of a blade as the VAWT rotates. At these points, the dual operation reverses the disposition of the blade, a maneuver that involves 1) pivoting the blade to present its camber oppositely, as from inboard to outboard or vice-versa, and 2) simultaneously reversing the aerodynamic profile of the blade by means of the internal appliances and appendages previously described. The reversing of the aerodynamic profile concurrently with the pivoting of the blade, maintains camber true with respect to the air stream. Otherwise, pivoting a blade to present its camber oppositely would also present its camber backwardly, with the tapered edge presented as the leading edge and the blunt nose as the trailing edge. Thus, the reversing of blade profile, concurrently with presenting the camber oppositely, is a corrective measure that maintains the blade 300 with a proper airfoil orientation, with the blunt nose leading and the tapered edge following. The pivoting of a blade 300 and the operation of its internal appliances and appendages is by means of motors operated through a system of sensors and controls.

The disclosed blade 300 is intended to be utilized in a VAWT designed as a framework rotatively supported from beneath that framework, as opposed to a framework suspended from a rotatable central axial support. As noted previously, in the exemplary embodiment presented herein, the framework 250 has an annular contour, but other contours may be used, for example a polygonal contour with the turbine blades mounted between or at the vertices thereof, without departing from the inventive concepts disclosed herein The blade 300 is suspended between the upper and lower members of the framework at a substantially vertical attitude. The framework is connected to the axis of rotation through rotor arms, but not, however, supported thereby. Turbine linear speed is governed by generator torque at the axis of rotation and is held at a constant velocity. Therefore, for the purpose of discussion herein, a linear speed is assumed for the blades 300 at or near the speed of true wind (the wind relative to a fixed point, the observation of which is not affected by the motion of the observer).

The blade 300 proceeds on its circuit against an air stream known as "apparent wind," this being the resultant of true wind and forward speed of a blade, combined as vectors. It is the apparent wind that generates lift at the blade 300. Due to VAWT aerodynamics, the velocity of apparent wind varies from point to point on the circuit of the blade 300, as will be discussed below. As the blade 300 progresses through its circuit, a system of sensors and controls maintains the pitch of the blade at the optimal angle with respect to the ever-changing apparent wind, and so optimizes the generation of lift.

Figure 20:
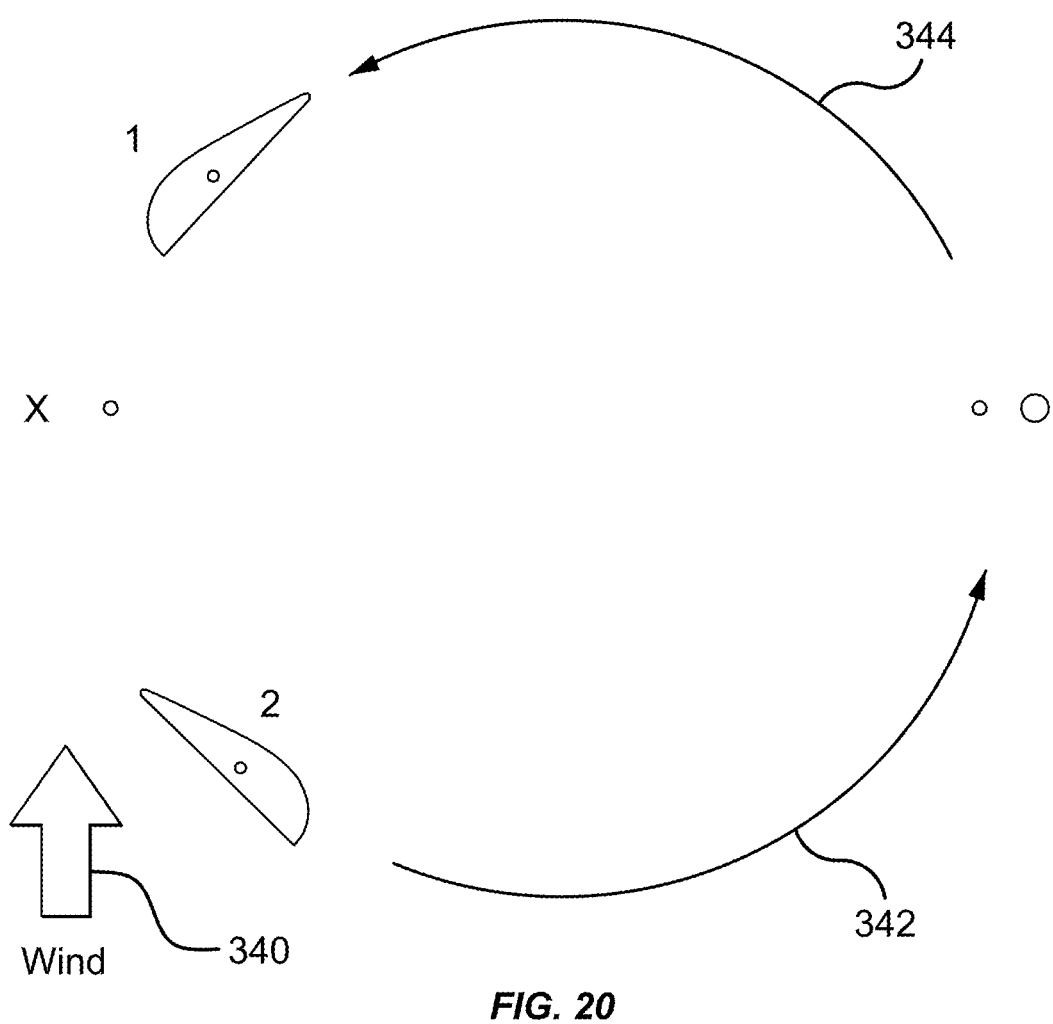
FIG. 20 is a diagram showing the circuit of a blade.

A diagram that represents the circuit described by the disclosed blade 300, as mounted in a turbine, is shown in FIG. 20. The diagram is a generalized representation valid for any and all wind directions. The blade 300 is at the perimeter of the turbine; wind direction is indicated by the directional arrow 340, and turbine rotation is counterclockwise, as signified by the directional arrows 342 and 344. The following discussion assumes a blade linear speed (or forward speed) equal to the velocity of true wind speed. The points X and O designate cardinal points opposed 180 degrees from one another, whose positions on the blade's circuit correspond to the direction of true wind, with reference to the counterclockwise movement of a blade. A cardinal point may be described as a point at which true wind forms a tangent to the circuit of a blade 300. The turbine radius, at this same point, forms a right angle with true wind. At the point X, a blade moving counterclockwise meets true wind as a direct headwind, which circumstance signifies cardinal point X. Thus, at X, the velocity of apparent wind reaches its maximal value, that is, twice the true wind speed (blade speed plus the speed of true wind). At point O, a blade encounters no apparent wind, as at this point the forward movement of a blade coincides, in speed and direction, with true wind. At this instant, the effect is that of still air, relative to the blade. Thus, moving counterclockwise from cardinal point O, a blade meets an apparent wind that increases in velocity from naught to a maximum at X. Continuing counterclockwise from X, however, a blade meets an apparent wind of diminishing velocity, the velocity reaching zero as the blade completes a circuit at O. At the same time, the value of lift ranges from zero (at O) to a maximum at a point closely proximate to X, decreasing to zero as a blade completes its circuit at O. However, at X, exactly, no lift is generated, because a blade is evolving through the dual operation.

Through study of FIG. 20 and the companion text below, it may be noted that for the blade illustrated in the figure, blade camber is presented outboard for half of a blade's circuit and inboard during the other half. The dual operation of blade 300 addresses the problematic aerodynamics of a VAWT. Referring further to diagram of FIG. 20, the dual operation is performed twice in a blade's circuit, at cardinal points X and O, where the reversing VAWT aerodynamics necessitate camber to be presented oppositely, from outboard to inboard at X and back again at O, inboard to outboard. As shown, the blade 300 at 1 has its cambered side presented outboard and then, at 2, with its disposition reversed and its camber presented inboard. At 1, lift is directed in an outboard direction and at 2, lift is directed inboard. At X, the blade 300 pivots clockwise through an obtuse angle, presenting its camber from outboard to inboard as blade profile is reversed, demonstrating the dual operation at X. A study of the aerodynamics of a single-camber blade makes clear that, if a blade's disposition is not reversed at X, but remains with its camber presented outboard as it moves counterclockwise beyond X, the blade consequently can generate lift only contrarily, meaning that the torque component of lift must be directed against the counterclockwise rotation of the turbine. Likewise, a contrary lift results when a blade proceeds counterclockwise past point O, if thereat blade camber is not restored to an outboard disposition.

As the disclosed blade 300, in traveling its circuit, reaches X or O, either point, the dual operation and consequent reversing of the blade's disposition is underway. At point O, the blade 300 is pivoted counterclockwise but, at X, the blade 300 is pivoted clockwise, in each instance the blade 300 is pivoted through an obtuse angle to present its camber oppositely, from outboard to inboard, or vice-versa. The time required for the dual operation should be very short.

Figure 25:
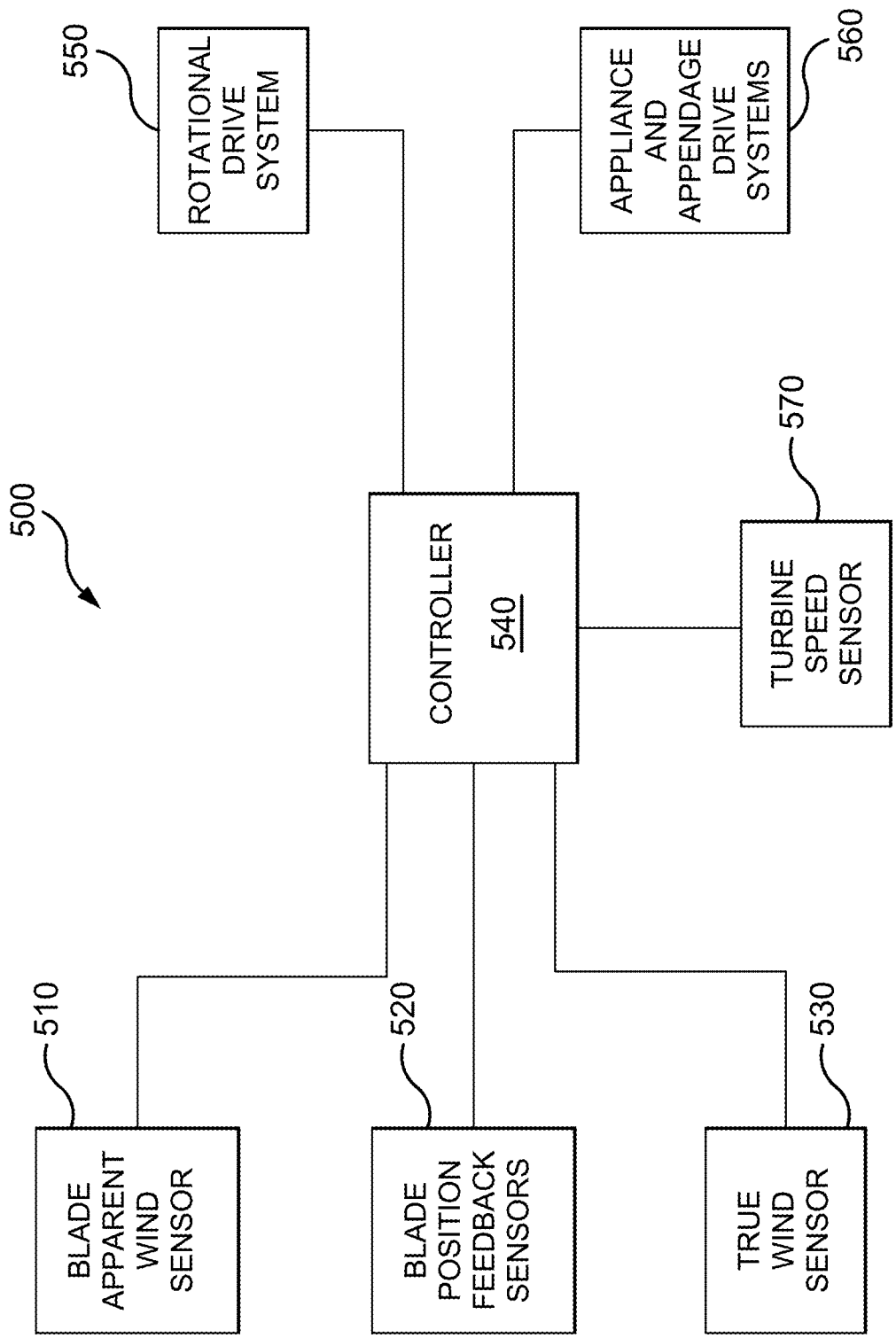
FIG. 25 is a block diagram of a control system of the present invention.

As shown in FIG. 25, the disclosed blade is operated through a control system 500 responsive to measurements of wind. At each blade 300 a control system 500 may be disposed on the upper member of the annular framework, for example. The control system 500 includes blade apparent wind sensor 510, blade position feedback sensors 520, a true wind sensor 530 and a turbine speed sensor 570, and a controller 540. The controller 540 may be implemented by a computer processor, microprocessor, programmable logic device, programmable controller, or the like. Such devices are well known in the art and the programing of such devices is well within the capabilities of those skilled in the relevant art. The apparent wind sensors 510 detect velocity and direction of apparent wind, with respect to the blade, and transmit this data to the controller 540. The controller processes data and operates the blade through control signals sent to the rotational drive system 550 and the appliance and appendage drive systems 560 in combination with the blade position feedback sensors 520. In other words, the blade pivot and the internal appliances and appendages are operated in response to the ever-changing metrics of wind.

The control system 500 includes the sensor 530 independent and separate from the turbine, herein referred to as the true wind sensor 530. The true wind sensor 530 gauges the speed and direction of true wind, which data is transmitted to the controller 540 of each blade via a wireless or wired connection therebetween. The velocity of true wind is required by each controller 540 as a reference in determining the corresponding blade's position with respect to cardinal point X, at which point the velocity of apparent wind reaches twice that of true wind. The controller 540 compares the velocity of true wind and apparent wind and, at the proper instant, triggers the dual operation and reverses blade disposition. As a circuiting blade approaches cardinal point O, the velocity of the apparent wind at the blade approaches zero, at which instant the controller 540 initiates the reversal of the blade disposition.

Another means of determining cardinal point X is provided through data on wind direction. At point X, a blade meets true wind as a direct headwind, which circumstance is signified by the alignment of the directions of true wind and apparent wind. The controller 540, determines such alignment through comparison of the respective data transmitted from the apparent wind sensor 510 and the true wind sensor 530. At alignment, the controller 540 control initiates the dual operation to reverse disposition of the blade.

Yet another means of determining a cardinal point involves a timing schedule. The turbine is operated at a constant speed, kept equal to the speed of true wind. Like the sweep hand of a clock or watch, a blade moving at constant forward speed reaches any particular point on the blade's circuit at regular and precise intervals of time. This clockwork aspect allows the implementation of a timing schedule to determine cardinal points and control operation of a blade. The schedule itself is determined by the speed of the turbine, that is, blade forward speed. Thus, for any particular blade speed, the blade 300 is operated according to a schedule unique to that particular speed. For example, if a turbine blade moves at a speed such that it completes a circuit in y seconds, then the blade moves from one cardinal point to the next, one-half a circuit, in a period of ½ y seconds. Therefore, at any particular instant, a blade's position between cardinal points is according to the relevant fraction of that period of ½ y seconds. In an example using specific values, if a turbine blade completes a circuit in twenty seconds, then a blade travels between cardinal points in ten seconds. In this instance, a blade travels, per second, one-tenth of the distance between cardinal points. Therefore, at nine seconds past the previous cardinal point, a blade is nine-tenths of the distance to the next cardinal point. At this instant, the controller 540 triggers the dual operation, and the disposition of a blade is reversed.

The different methods of determining cardinal points are integrated into a self-correcting system of control that insures reliable determination of a cardinal point. Through data transmitted from the true wind sensor 530, the controller 540 records gusts, veering, and such flaws of true wind. This information provides the controller 540 control a way to resolve any discrepancy that may occur among the several determinations of a cardinal point. For example, through a gust, the controller 540 receives an indication of an increased velocity for apparent wind. Such aberrant data could result in a spurious determination of a cardinal point. The spurious determination should disagree with the other determinations. However, the controller 540, having recorded the gust, has criteria to evaluate the discrepancy and reject the spurious determination as resulting from aberrant data.

The veering or backing of true wind likewise occasions adjustments in the control system 500. In this case, adjustments are required to the timing schedule method of determining a cardinal point. For example, as a weather front moves through, the direction of true wind may veer from southwest to west within an hour. This veer of four compass points in wind direction changes the azimuth of cardinal points X and O, as these points correspond to the direction of true wind and migrate according to the degree of veer. Such migration necessitates corrective adjustments to the timing schedule method of determining a cardinal point. The schedule is adjusted according to the degree of veer, as recorded at the controller 540. In this case, a brief interval of steady wind provides the necessary data to the controller 540 for a reliable determination of the degree of veer and the changes in the azimuths of the cardinal points. Such adjustment will be ongoing for the duration of an episode of veering.

The self-correcting system of controls detects, assesses and accommodates flaws of true wind and thereby perfects the operation of the disclosed blade 300 and optimizes its efficiency. The blade 300 also may be operated to accommodate the more severe aspects of true wind. For example, as a precaution against the threat of severe wind, as from an impending storm, a turbine may be taken from service with the blades set at the stall angle and both contoured forms 306 and 306a disengaged and both appendages 305 and 305a folded. Also, if wind velocity increases beyond a certain threshold, a turbine might be removed from service. Alternatively, the blades 300 might be operated at a less efficient pitch with respect to apparent wind and so limit the force of lift generated at a blade. Conditions of variable wind often are associated with light wind, which conditions might not justify operation of the turbine.

The control system 500 maintains a blade 300 at optimal pitch, pitch being the angle formed by the chord of an airfoil with the incident airstream. The efficiency of an airfoil is determined by this angle, and optimal pitch provides optimal efficiency. As the disclosed blade 300 travels between two cardinal points against the ever-changing apparent wind, optimal pitch is maintained through pivoting the blade at a rate that may be given in degrees per second. Put another way, as a blade travels between two cardinal points, from one to the next, its chord pivots through an angle of about forty-five degrees, more or less, as the system of controls maintains the chord at optimal pitch. Note, the referred angle of forty-five degrees is separate and exclusive of the obtuse angle through which a blade is pivoted, at each cardinal point, in order to present its camber oppositely.

The controller 540 will control torque at the generator and adjusts it according to the speed of true wind, as informed by data transmitted from the true wind sensor 530 via wireless, wired, or through a combination of such methods of transmission. The control system 500 maintains turbine speed, that is, blade forward speed, at the speed of true wind. A sensor 570 measures turbine speed and relays this data as feedback to the above controller 540 and thereby operates the rotational drive system 550 of appropriate turbine blades 300 to adjust the output torque of the VAWT.

Although the inventive concepts disclosed herein have has been described in connection with specific exemplary forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements or processes may be reversed or interposed, all without departing from the spirit or scope of the invention as defined in the appended claims.

What is claimed is:

1. A turbine blade mounting system for supporting each of a plurality of turbine blades between a pair of vertically spaced and rotatably supported frameworks of a vertical axis wind turbine, said turbine blade mounting system including a pair of mounting units respectively pivotally coupled to opposing ends of a corresponding turbine blade, each of said pair of mounting units comprising:
   a carriage displaceably mounted to a corresponding one of said pair of frameworks, said carriage being displaceable along a radially directed path with respect to a rotational axis of said pair of frameworks;
   a pivot receptacle mounted to said carriage and into which an end portion of an axial shaft of said corresponding turbine blade is received; and
   a restraint system coupled to said carriage, said restraint system including at least a pair of mechanical energy storage elements coupled between said carriage and said corresponding framework for applying a force to said carriage in opposition to displacement of said carriage being displaced in either of opposing radial directions from an initial position.

2. The mounting system as recited in claim 1, where said restraint system includes a primary mechanical energy storage assembly coupled between said carriage and said corresponding framework to thereby store displacement energy supplied by said carriage and return a force to said carriage counter to that displacement.

3. The mounting system as recited in claim 2, where said primary mechanical energy storage assembly includes at least a pair of mechanical energy storage elements respectively coupled between one of a pair of opposing sides of said carriage and said corresponding framework.

4. The mounting system as recited in claim 2, where said primary mechanical energy storage assembly includes at least two pairs of mechanical energy storage elements, each of said pairs of mechanical energy storage elements being respectively coupled between one of a pair of opposing sides of said carriage and said corresponding framework.

5. The mounting system as recited in claim 2, where said primary mechanical energy storage assembly includes:
   a multiplicity of lever sets, each of said plurality of lever sets being pivotally coupled to said corresponding framework and having a lever arm extending therefrom and pivotally coupled to said carriage; and
   a plurality of mechanical energy storage elements coupled to each of the multiplicity of lever sets.

6. The mounting system as recited in claim 2, where said restraint system further includes a secondary mechanical energy storage assembly coupled to said corresponding framework and disposed in correspondence with said radially directed path of said carriage and thereby establishing resilient displacement limits of said carriage.

7. The mounting system as recited in claim 1, where said restraint system further includes a dampening system including a gear rack coupled to said carriage and a pinion gear engaged with said gear rack and drivingly coupled to a work producing mechanical load.

8. The mounting system as recited in claim 1, where said restraint system further includes a dampening system including at least a pair of dampening devices, each of said pair of dampening devices being respectively coupled to a corresponding one of two opposing sides of said carriage.

9. The mounting system as recited in claim 8, where each said dampening device is coupled to said carriage through coupling to a corresponding one of said mechanical energy storage elements.

10. The mounting system as recited in claim 3, where each of said mechanical energy storage element of said at least a pair of mechanical energy storage elements is selected from said group consisting of a leaf spring, a coil spring, paralleled multiples thereof, and combinations thereof.

11. The mounting system as recited in claim 6, where said secondary mechanical energy storage assembly includes a plurality mechanical energy storage elements, each of said plurality mechanical energy storage elements of said secondary mechanical energy storage assembly being formed by at least one of leaf springs or torsion bars.

12. The mounting system as recited in claim 1, further comprising a blade rotation drive system mechanically coupled to said corresponding turbine blade for rotation thereof responsive to an angular rotative position of said frameworks of said vertical axis wind turbine.

13. The mounting system as recited in claim 1, further comprising a blade rotation drive system coupled to at least one mounting unit and including:
   a motor having an output shaft, said motor being controlled to rotate said output shaft to drive rotation of said corresponding turbine blade;
   a drive sprocket coupled to said output shaft of said motor to rotate therewith;

a driven sprocket wheel coupled to said end portion of said axial shaft of said corresponding turbine blade for rotation therewith; and a drive chain drivingly engaged with said drive and driven sprockets for rotating said driven sprocket and said axial shaft of said corresponding turbine blade therewith responsive to rotation of said output shaft of said motor.

* * * * *